United States Patent
Choi et al.

(10) Patent No.: US 11,521,140 B2
(45) Date of Patent: *Dec. 6, 2022

(54) APPARATUS FOR PROCESSING WORK OBJECT AND METHOD PERFORMING THE SAME

(71) Applicants: DELTA PDS CO., LTD, Seoul (KR); Hyun Kyu Choi, Seoul (KR); Dong Kyu Choi, Seoul (KR); Jae Ho Choi, Seoul (KR)

(72) Inventors: Hyun Kyu Choi, Seoul (KR); Dong Kyu Choi, Seoul (KR); Jae Ho Choi, Seoul (KR)

(73) Assignees: DELTA PDS CO., LTD., Seoul (KR); Hyun Kyu Choi, Seoul (KR); Dong Kyu Choi, Seoul (KR); Jae Ho Choi, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/085,242

(22) Filed: Oct. 30, 2020

(65) Prior Publication Data

US 2021/0049538 A1 Feb. 18, 2021

Related U.S. Application Data

(63) Continuation of application No. 15/380,939, which is a continuation-in-part of application No. (Continued)

(30) Foreign Application Priority Data

Apr. 24, 2015 (KR) .................. 10-2015-0058308
Dec. 15, 2015 (KR) .................. 10-2015-0179076

(Continued)

(51) Int. Cl.
  *G06Q 10/00* (2012.01)
  *G06Q 10/06* (2012.01)
  (Continued)

(52) U.S. Cl.
  CPC ..... *G06Q 10/063114* (2013.01); *G06Q 50/01* (2013.01); *H04L 51/216* (2022.05)

(58) Field of Classification Search
  None
  See application file for complete search history.

(56) References Cited

U.S. PATENT DOCUMENTS 8,660,878 B2 * 2/2014 Bernardini ....... G06Q 10/06311
  700/109
8,671,007 B2 * 3/2014 Chaar ................ G06Q 10/0631
  705/7.11

(Continued)

FOREIGN PATENT DOCUMENTS

KR 10-2000-0064226 A 11/2000
KR 10-2004-0034063 A 4/2004

(Continued)

OTHER PUBLICATIONS

Cho, Hee-Kyung, The Use of Instant Messaging in Working Relationship Development: A Case Study, Jun. 23, 2006, Journal of Computer-Mediated Communication, https://onlinelibrary.wiley.com/doi/full/10.1111/j.1083-6101.2005.tb00280.x, p. 1-32. (Year: 2006).*

(Continued)

*Primary Examiner* — Joseph M Waesco
(74) *Attorney, Agent, or Firm* — Paratus Law Group, PLLC

(57) ABSTRACT

A work object processing apparatus includes: a message thread processing unit configured to be displayed through a chat room of an Internet messenger associated with a message thread, to receive a work object including a work (Continued)

producer, a work processor, and work contents, and to process a work object operation on the message thread; and a work object processing unit configured to process a work object state of the work object changed, from among a plurality of work object states of the work object included in a work processing diagram, based on a work interaction between the work producer and the work processor.

15 Claims, 14 Drawing Sheets

Related U.S. Application Data

PCT/KR2016/003241, filed on Mar. 30, 2016, now Pat. No. 10,860,958.

(30) Foreign Application Priority Data

| Jan. 25, 2016 | (KR) | 10-2016-0008822 |
|---|---|---|
| Apr. 4, 2016 | (KR) | 10-2016-0040933 |
| Apr. 14, 2016 | (KR) | 10-2016-0045406 |
| Apr. 15, 2016 | (KR) | 10-2016-0046083 |
| Nov. 8, 2016 | (KR) | 10-2016-0148354 |

(51) Int. Cl.
*G06Q 50/00* (2012.01)
*H04L 51/216* (2022.01)

(56) References Cited

U.S. PATENT DOCUMENTS

| 8,880,436 | B2* | 11/2014 | Chan | G06Q 10/10 705/301 |
|---|---|---|---|---|
| 9,959,578 | B2* | 5/2018 | Sugiyama | G06Q 10/0639 |
| 2003/0004744 | A1* | 1/2003 | Greene | H04L 67/51 705/1.1 |
| 2003/0004774 | A1* | 1/2003 | Greene | H04L 41/5058 705/7.14 |
| 2003/0009536 | A1* | 1/2003 | Henderson | G06Q 10/10 709/219 |
| 2004/0064351 | A1* | 4/2004 | Mikurak | G06Q 30/0269 705/22 |
| 2006/0284838 | A1* | 12/2006 | Tsatalos | G06Q 10/10 345/156 |
| 2007/0150327 | A1* | 6/2007 | Dromgold | G06F 16/2477 705/7.17 |
| 2009/0049131 | A1* | 2/2009 | Lyle | H04L 51/04 709/206 |
| 2009/0204470 | A1* | 8/2009 | Weyl | G06Q 10/06 705/7.13 |
| 2009/0222837 | A1* | 9/2009 | Sugahara | G06Q 10/06 718/105 |
| 2009/0319608 | A1* | 12/2009 | Anil | G06Q 10/06 709/204 |
| 2011/0106738 | A1* | 5/2011 | Cheklin | G06Q 10/10 706/14 |
| 2011/0166904 | A1* | 7/2011 | Arrowood | G06Q 10/06313 705/7.23 |
| 2011/0202439 | A1* | 8/2011 | Ricci | G06Q 30/04 715/706 |
| 2012/0278738 | A1* | 11/2012 | Kruse | G06Q 10/10 715/756 |
| 2012/0290950 | A1* | 11/2012 | Rapaport | H04L 67/306 715/753 |
| 2013/0046828 | A1* | 2/2013 | Grewal | G06Q 10/10 709/204 |
| 2014/0188681 | A1* | 7/2014 | Shahghasemi | G06Q 20/384 705/37 |
| 2014/0208325 | A1* | 7/2014 | Chen | G06Q 10/107 718/102 |
| 2014/0244653 | A1* | 8/2014 | Plotkin | G06Q 10/06311 707/741 |
| 2014/0344718 | A1* | 11/2014 | Rapaport | H04L 51/52 715/753 |
| 2015/0019666 | A1* | 1/2015 | Ruff | H04W 4/08 709/206 |
| 2015/0156226 | A1* | 6/2015 | Hollis | G06F 3/0482 715/753 |
| 2015/0213561 | A1* | 7/2015 | Hollis | G06Q 30/02 705/14.66 |
| 2015/0236993 | A1* | 8/2015 | Notani | H04L 51/063 709/206 |
| 2015/0269617 | A1* | 9/2015 | Mikurak | G06Q 30/0633 705/14.54 |
| 2015/0310188 | A1* | 10/2015 | Ford | G06F 21/10 726/28 |
| 2015/0334469 | A1* | 11/2015 | Bhatia | H04N 21/8586 725/32 |
| 2016/0077674 | A1* | 3/2016 | Forster | H04L 51/04 715/753 |
| 2016/0173616 | A1* | 6/2016 | Bank | H04L 67/148 709/227 |
| 2016/0224939 | A1* | 8/2016 | Chen | G06Q 10/06311 |
| 2017/0068926 | A1* | 3/2017 | Eom | G06Q 10/063118 |
| 2017/0235848 | A1* | 8/2017 | Van Dusen | G06N 5/02 705/12 |

FOREIGN PATENT DOCUMENTS

| KR | 10-2005-0092173 A | 9/2005 |
|---|---|---|
| KR | 10-2006-0012875 A | 2/2006 |
| KR | 10-0663494 B1 | 1/2007 |
| KR | 10-0684333 B1 | 2/2007 |
| KR | 10-2009-0013276 A | 2/2009 |
| KR | 10-2009-0102142 A | 9/2009 |
| KR | 10-2009-0105522 A | 10/2009 |
| KR | 10-2009-0116584 A | 11/2009 |
| KR | 10-2013-0035250 A | 4/2013 |
| KR | 10-2013-0073341 A | 7/2013 |
| KR | 10-2014-0068469 A | 6/2014 |
| KR | 10-2014-0127771 A | 11/2014 |

OTHER PUBLICATIONS

Collabee, The point of the conference is R&R, designating the person in charge through the app, "Collabee", Dec. 17, 2014, Instructions for Use of Collabee, Collabee's blog, Collabee team, http://blog.collabee.co.kr/20.
Collabee, What is "Collabee?", Sep. 8, 2014, About Collabee, Collabee's blog, Collabee team, http://blog.collabee.co.kr/3.
Korean Office Action for related KR Application No. 10-2015-0058308 dated May 1, 2017 from Korean Patent Office.
Korean Office Action for related KR Application No. 10-2015-0179076 dated Nov. 21, 2016 from Korean Patent Office.
Korean Office Action for related KR Application No. 10-2016-0008822 dated Jan. 17, 2017 from Korean Patent Office.
Korean Office Action for related KR Application No. 10-2016-0040933 dated Nov. 25, 2016 from Korean Patent Office.
Korean Office Action for related KR Application No. 10-2016-0045406 dated Oct. 20, 2016 from Korean Patent Office.
Korean Office Action for related KR Application No. 10-2016-0046083 dated Oct. 24, 2016 from Korean Patent Office.
Build an Android Multi-User, Collaborative To-Do App, Apr. 2, 2015, PubNub, http://www.pubnub.com/blog/build-an-android-muti-user-collaborative-to-do-app/, 2015, pp. 1-5.

* cited by examiner

User A

- Profile info : Name (chat name), sex, age...

- To-do info ( Work object list )

| No. | Chat | Object |
|---|---|---|
| 1 | Ch#7 | Obj#3 |
| . | . | . |
| . | . | . |
| . | . | . |
| X | Ch#2 | Obj#2 |

410   420

APPARATUS FOR PROCESSING WORK OBJECT AND METHOD PERFORMING THE SAME

CROSS-REFERENCE TO PRIOR APPLICATIONS

This application is a Continuation Application of U.S. patent application Ser. No. 15/380,939 (filed on Dec. 15, 2016), which is a Continuation-In-Part Application of PCT International Application No. PCT/KR2016/003241 (filed on Mar. 30, 2016), which claims priority to Korean Patent Application Nos. 10-2015-0058308 (filed on Apr. 24, 2015), 10-2015-0179076 (filed on Dec. 15, 2015), 10-2016-0008822 (filed on Jan. 25, 2016), 10-2016-0040933 (filed on Apr. 4, 2016), 10-2016-0045406 (filed on Apr. 14, 2016), 10-2016-0046083 (filed on Apr. 15, 2016), and 10-2016-0148354 (filed on Nov. 8, 2016), which are all hereby incorporated by reference in their entirety.

BACKGROUND

The present invention relates to a work object processing technology, and more particularly, to a work object processing apparatus and method capable of managing a work more efficiently by receiving a work object through a chat room and updating a current work object state through a work interaction between a work producer and a work processor.

An Internet messenger corresponds to an application for transferring messages including text or/and graphics between users and may be implemented by a chat room in which a plurality of users participates. In one embodiment, an Internet messenger may include a mobile messenger performed in a mobile environment (e.g., a portable phone) and may include Kakao Talk, Line, WeChat, and Facebook messengers, for example.

An Internet messenger may notify a user whether a counterpart has checked a message and the state in which the counterpart has participated in a chat room in order to support the transfer of the user's intention to the counterpart through the message. As the number of users who use an Internet messenger suddenly increases, a variety of applications used in a mobile environment are being developed. A work processing program of the applications is used by many users.

Korean Patent Application Publication No. 10-2005-0092173 relates to a data input method and screen display method for work processing in a mobile device, and discloses a technology for displaying a to-do list in a row or column in a table form, displaying things to be done corresponding to a corresponding date in a box form when any one date is selected, wherein boxes at the left and right ends of a box correspond to the start date and end date of corresponding things to do, marking information about a start date and end date in each of boxes at left and right ends displayed on a screen if start date and end date boxes are not displayed on a screen, displaying information about the corresponding things to do within the box, and outputting a select window including the completion of a thing to do, the postponement of a thing to do, the termination of a thing to do, and the progress of a thing to do so that a user can manipulate contents stored by date with respect to the corresponding things to do.

Korean Patent No. 10-0663494 relates to a method for managing a thing to do using a mobile communication terminal and discloses a technology for determining whether a predetermined time has been reached, checking the item of a thing to do that belongs to the items of previously registered things to do and that has not been completed when the predetermined time is reached, and displaying the items of the uncompleted things to do based on a result of the check.

RELATED DOCUMENT

Patent Document

Korean Patent Application Publication No. 10-2005-0092173 (laid open on Sep. 21, 2005)
Korean Patent No. 10-0663494 (registered on Dec. 22, 2006)

SUMMARY

An embodiment of the present invention provides a work object processing apparatus and method, which are capable of managing a work more efficiently by receiving a work object through a chat room and updating a current work object state through a work interaction between a work producer and a work processor.

An embodiment of the present invention provides a work object processing apparatus and method, which are capable of providing support so that a work producer and a work processor can receive a work object through a chat room associated with a message thread and can conveniently perform a work instruction, work evaluation, and a work execution response through a work message.

An embodiment of the present invention provides a work object processing apparatus and method, which are capable of efficiently processing a work object by incorporating a work interaction between a work producer and a work processor into the work object state of the work object based on a work processing diagram.

An embodiment of the present invention provides a work object processing apparatus and method, which are capable of improving efficiency of communication between a work producer and a work processor by providing support so that chats regarding a work can be exchanged through a work message through which work interactions between the work producer and the work processor can be exchanged and a chat message in which a chat regarding a work is written.

In the embodiments, the work object processing apparatus includes a memory unit configured to include a user memory region associated with user information, a message thread memory region accessible through the user information and associated with a message thread, and a work object memory region accessible through the message thread and associated with a work object, a message thread processing unit configured to receive a work object, including a work producer, a work processor, and work contents, through a chat room associated with a message thread and to process work object operation on the message thread, and a work object processing unit configured to process a work object state of the work object changed in a work processing diagram depending on a work interaction between the work producer and the work processor.

The work object processing unit may determine a predetermined work processing state in the work processing diagram by incorporating a request by one of the work producer and the work processor and a request by the other of the work producer and the work processor into the work processing state.

When the work processing state is determined, the work object processing unit may provide the work producer with work processing state information so that a work processing state image associated with work processing state is incorporated into a profile image of the work processor.

If a work deadline has been designated in the work object, the work object processing unit may provide work deadline information to the work producer so that a work deadline image associated with the work deadline is additionally incorporated into the profile image of the work processor.

If a specific friend of a friend list is selected through a messenger installed on a user terminal, one or more corresponding chat rooms are provided in order of deadlines, and a specific chat room is selected, the work object processing unit may receive the work object through the specific chat room.

When a specific work date in a work schedule is selected through a messenger installed on a user terminal and a specific chat room of one or more corresponding chat rooms is selected, the work object processing unit may receive the work object through the specific chat room.

If a work evaluation point assigned based on rights of the work producer is associated with the work object and the work object state is detected as a completion state indicating that the work processor has received a work solution request and the work producer has received a processing completion response, the work object processing unit may provide the work evaluation point to the work processor.

The message thread processing unit may provide a user terminal with a work object list including a chat room identifier and a work object identifier so that the user terminal enters a chat room in which the user terminal now participates through the chat room identifier or accesses a work object which is in progress through the work object identifier.

The message thread processing unit may determine a work object which belongs to work objects associated with the message thread and which is associated with the nearest work deadline to be a representative work object of the chat room, and may provide the representative work object to at least one participant terminal so that the representative work object is displayed in a specific region of the chat room when the at least one participant terminal enters the chat room.

The message thread processing unit may provide statistically summarized work progress information about the work object state of the work object to at least one participant terminal so that the at least one participant terminal further displays work progress information in a specific region of the chat room.

The message thread processing unit may recommend a work organization associated with the work producer as the subject of the work processor in a process of receiving a work object associated with the message thread.

The work object processing apparatus may further include a work organization management unit configured to analyze the data of a group to which each of users included in the user information belongs based on information about the group, to compute the degree of completion of the work object state of each of a plurality of work objects performed by the group for each group, and to provide the degree of completion computed for each group to each of users belonging to a corresponding group.

If a work deadline has been designated in the work object, the work object processing unit may previously notify the work processor of the work deadline by including the work deadline in a work object node of the work processing diagram.

In the embodiments, a work object processing method performed by a work object processing apparatus, including a user memory region associated with user information, a message thread memory region accessible through the user information and associated with a message thread, and a work object memory region accessible through the message thread and associated with a work object, includes a message thread processing step of receiving a work object, including a work producer, a work processor, and work contents, through a chat room associated with a message thread and processing work object operation on the message thread and a work object processing step of processing a work object state of the work object changed in a work processing diagram depending on a work interaction between the work producer and the work processor.

The work object processing step may include determining a predetermined work processing state in the work processing diagram by incorporating a request by one of the work producer and the work processor and a request by the other of the work producer and the work processor into the work processing state.

The disclosed technology may have the following effects. However, it is not meant that a specific embodiment should include all of the following effects or include only the following effects, and thus the range of the right of the disclosed technology should not be construed as being restricted by the description.

The work object processing apparatus and method according to an embodiment of the present invention can manage a work more efficiently by receiving a work object through a chat room and updating a current work object state through a work interaction between a work producer and a work processor.

The work object processing apparatus and method according to an embodiment of the present invention can provide support so that a work producer and a work processor can receive a work object through a chat room associated with a message thread and can conveniently perform a work instruction, work evaluation, and a work execution response through a work message.

The work object processing apparatus and method according to an embodiment of the present invention can efficiently process a work object by incorporating a work interaction between a work producer and a work processor into the work object state of the work object based on a work processing diagram.

The work object processing apparatus and method according to an embodiment of the present invention can improve efficiency of communication between a work producer and a work processor by providing support so that chats regarding a work can be exchanged through a work message through which work interactions between the work producer and the work processor can be exchanged and a chat message in which a chat regarding a work is written.

BRIEF DESCRIPTION OF THE DRAWINGS

FIG. 4 is a diagram illustrating the data structure of a user terminal 120 shown in FIG. 1.

DETAILED DESCRIPTION

Figure 1:
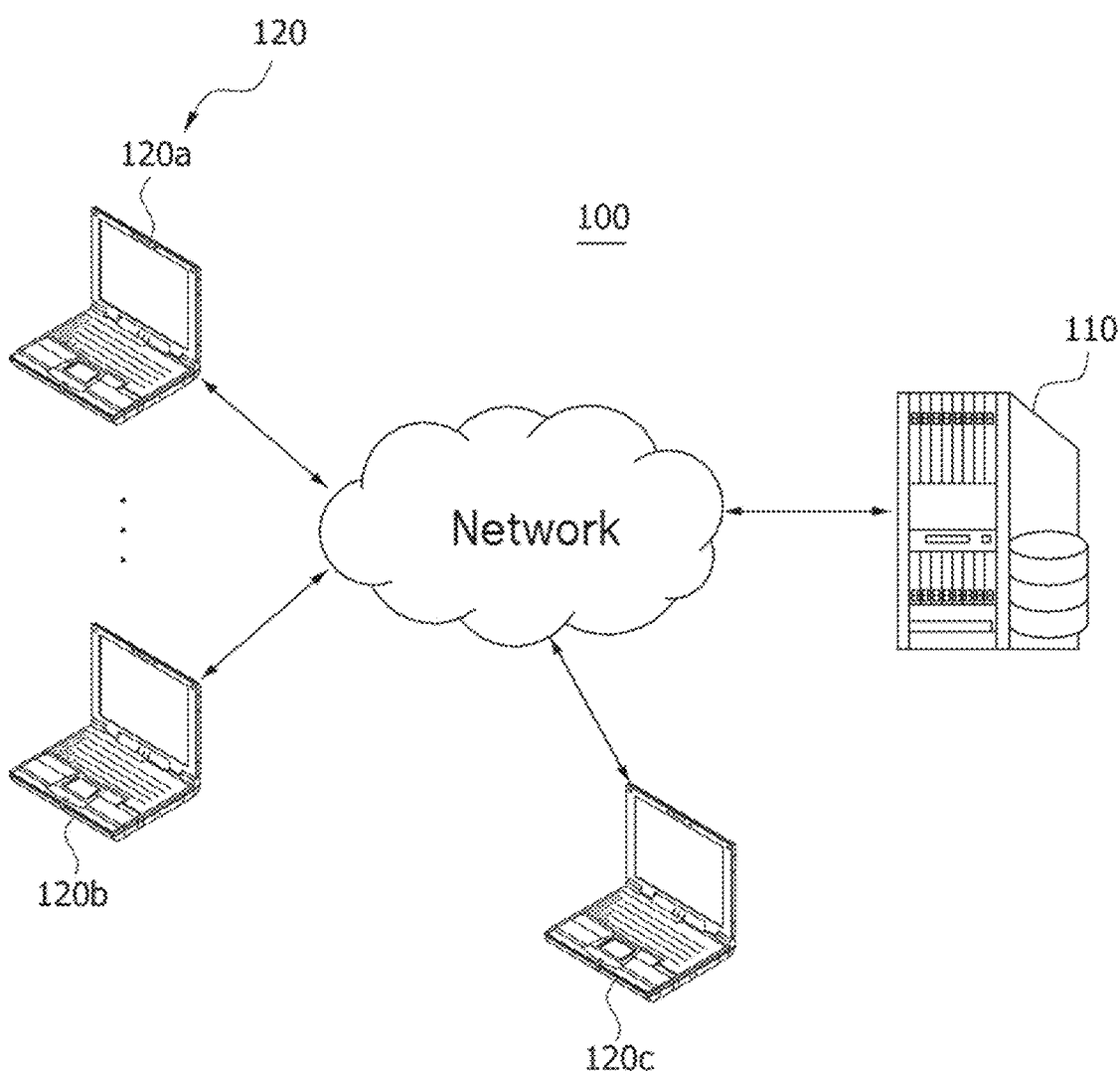
FIG. 1 is a diagram illustrating a work object processing system according to an embodiment of the present invention.

A description of the present invention is merely an embodiment for a structural and/or functional description. The range of right of the present invention should not be construed as being limited to embodiments described in the context. That is, the embodiments may be modified in various forms, and the range of right of the present invention should be construed as including equivalents which may realize the technological spirit. Furthermore, an object or effect proposed in the present invention does not mean that a specific embodiment should include all of objects or effects or should include a corresponding effect, and thus the range of right of the present invention should not be understood to be restricted thereby.

The meaning of terms described in this application should be construed as follows.

The terms, such as the "first" and the "second", are used to distinguish one element from the other element, and the range of right of the present invention should not be restricted by the terms. For example, a first element may be named a second element. Likewise, a second element may be named a first element.

When it is said that one element is described as being "connected" to the other element, the one element may be directly connected to the other element, but it should be understood that a third element may be interposed between the two elements. In contrast, when it is described that one element is described as being "directly connected" to the other element, it should be understood that a third element is not interposed between the two elements. Meanwhile, the same principle applies to other expressions, such as "between ~" and "just between ~" or "adjacent to ~" and "adjacent just to ~", which describe a relation between elements.

An expression of the singular number should be understood to include plural expressions, unless clearly expressed otherwise in the context. The terms, such as "include" or "have", should be understood to indicate the existence of a set characteristic, number, step, operation, element, part, or a combination of them and not to exclude the existence of one or more other characteristics, numbers, steps, operations, elements, parts, or a combination of them or a possibility of the addition of them.

In each of steps, symbols (e.g., a, b, and c) are used for convenience of a description, and the symbols do not describe order of the steps. The steps may be performed in order different from order described in the context unless specific order is clearly described in the context. That is, the steps may be performed according to described order, may be performed substantially at the same time, or may be performed in reverse order.

The present invention may be implemented in a computer-readable recording medium in the form of computer-readable code. The computer-readable recording medium includes all types of recording devices in which data readable by a computer system is stored. The computer-readable recording medium may include ROM, RAM, CD-ROM, magnetic tapes, floppy disks, and optical data storages, for example. Furthermore, the computer-readable recording medium includes one implemented in the form of carrier waves (e.g., transmission through the Internet). Furthermore, the computer-readable recording medium may be distributed to computer systems connected over a network, and the computer-readable code may be stored and executed in the computer systems in a distributed manner.

All the terms used herein, including technological or scientific terms, have the same meanings as those that are typically understood by those skilled in the art, unless otherwise defined. Terms, such as ones defined in common dictionaries, should be construed as having the same meanings as those in the context of related technology and should not be construed as having ideal or excessively formal meanings, unless clearly defined in the specification.

FIG. 1 is a diagram illustrating a work object processing system according to an embodiment of the present invention.

Referring to FIG. 1, the work object processing system 100 includes a work object processing apparatus 110 and a user terminal 120, which may be connected over a network.

The work object processing apparatus 110 may be connected to the user terminal 120, and may manage message threads in which messages transmitted by user groups configured through the at least one user terminal 120 have been grouped. In one embodiment, the message thread may be implemented by a chat room or group post of an Internet messenger. In another embodiment, the message thread may be implemented through the post of an online bulletin board or the post of a social network service (SNS). For example, the work object processing apparatus 110 may manage a plurality of user groups. Each of the user groups may include at least one user. The work object processing apparatus 110 may generate message threads corresponding to the respective user groups and manage the user groups.

The user terminal 120 corresponds to a computing device connected to the work object processing apparatus 110, and may be implemented by a desktop, a notebook, a tablet PC or a smart phone, for example. In one embodiment, a first user terminal 120*a* may correspond to a mobile terminal and may be connected the work object processing apparatus 110 through cellular communication or Wi-Fi communication. In another embodiment, a second user terminal 120*b* may correspond to a desktop and may be connected the work object processing apparatus 110 through the Internet.

Figure 2:
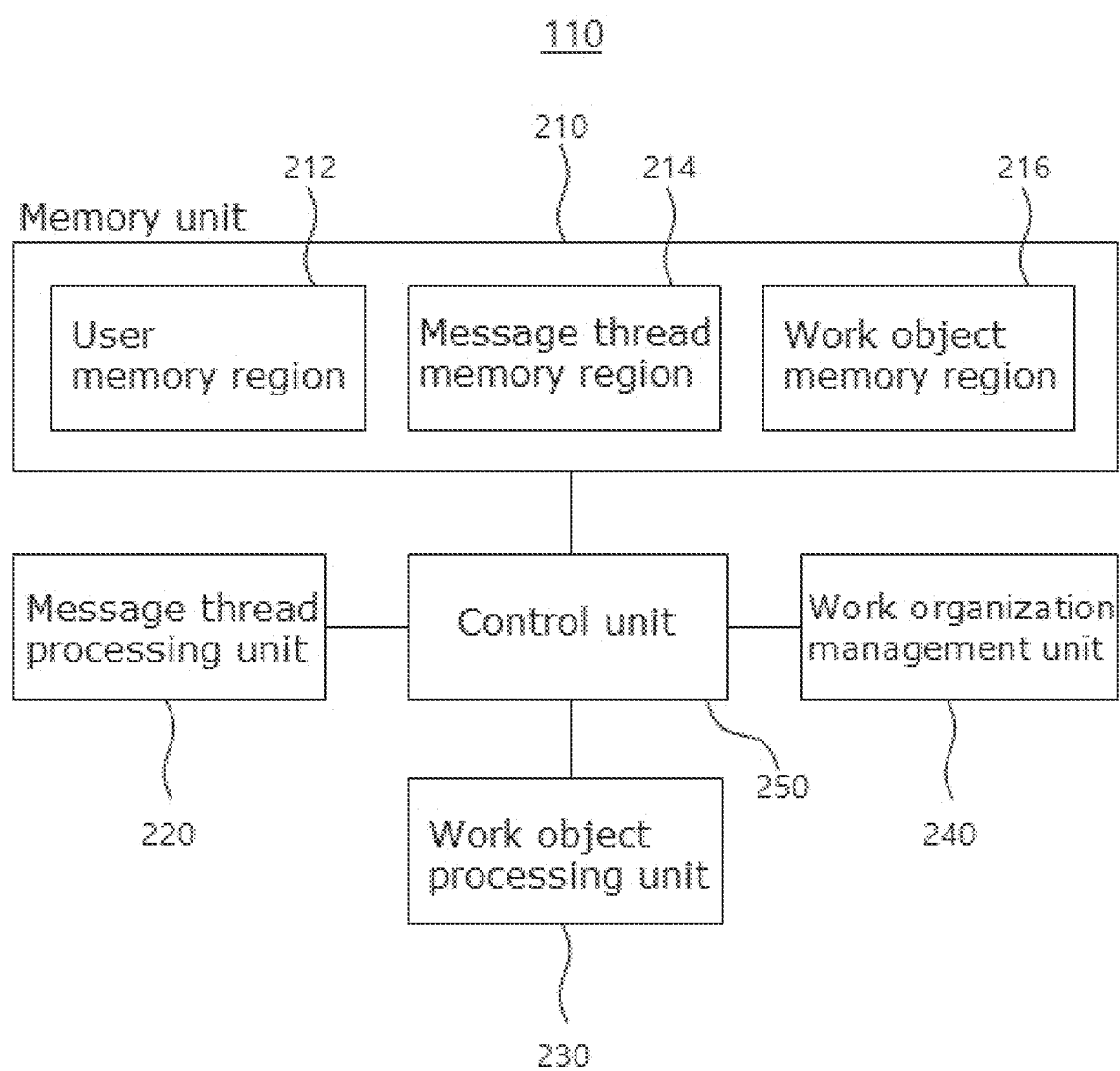
FIG. 2 is a block diagram of a work object processing apparatus shown in FIG.

FIG. 2 is a block diagram of the work object processing apparatus shown in FIG.

Referring to FIG. 2, the work object processing apparatus 110 may include a memory unit 210, a message thread processing unit 220, a work object processing unit 230, a work organization management unit 240, and a control unit 250, which may be connected together.

Figure 3:
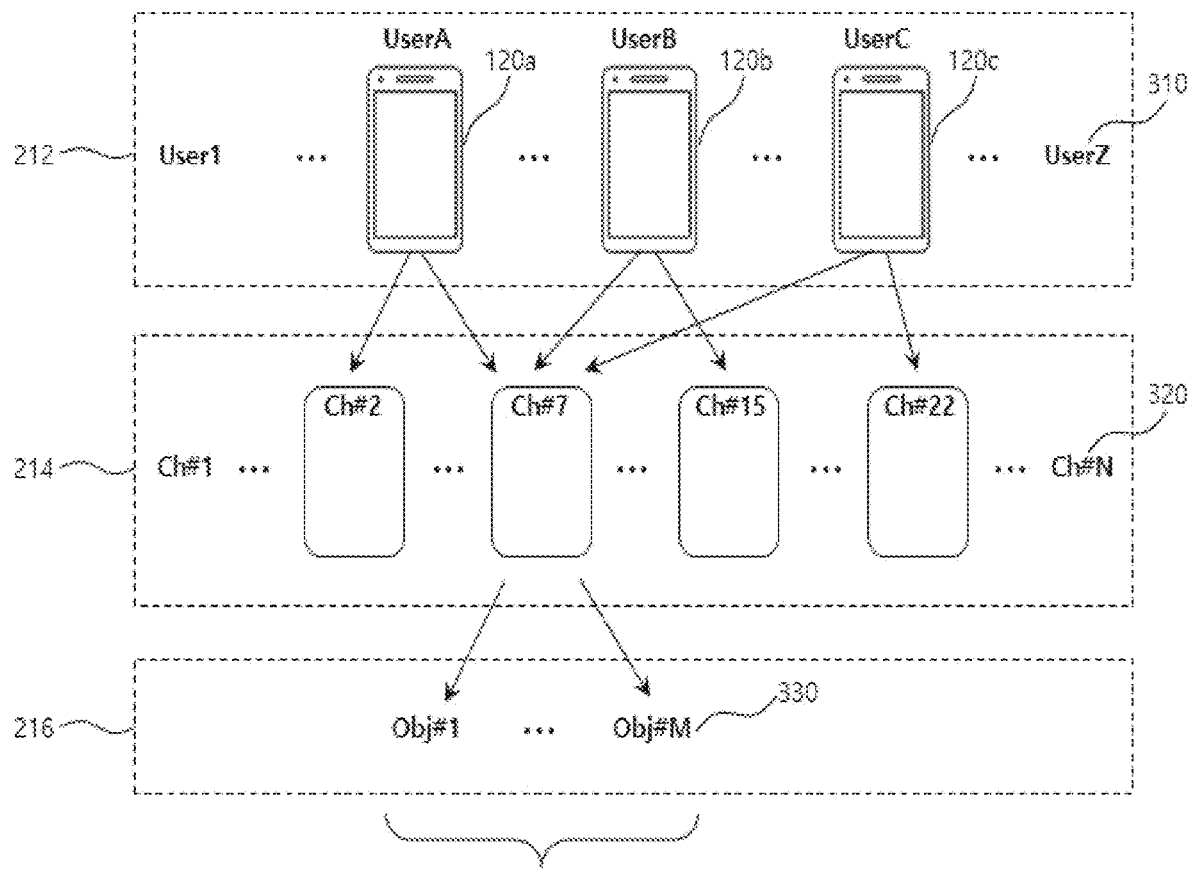
FIG. 3 is a diagram illustrating the data structure of the work object processing apparatus of FIG. 1.

The memory unit 210 may store data which is used in an overall operation of the work object processing apparatus 110, and includes a user memory region 212, a message thread memory region 214, and a work object memory region 216. The memory regions 212-216 may be implemented by non-volatile memory and may be implemented so that they are coupled through hyperlink. Such contents are described below with reference to FIG. 3. FIG. 3 is a diagram illustrating the data structure of the work object processing apparatus of FIG. 1.

The user memory region 212 is associated with user information 310. The message thread memory region 214 may be accessed through the user information 310 and is associated with a message thread 320. The work object memory region 216 may be accessed through the message thread 320 and is associated with a work object 330. In this case, the user information 310 may include at least one of the name (chat name), messenger ID, and password of a user, the affiliated group of the user, a friend list associated with the user, and work evaluation point information about the user. For example, user information 310 associated with a UserA may be associated with message threads 320 corresponding to a Ch #2 and a Ch #7, respectively. User information 310 associated with a UserB may be associated with message threads 320 corresponding to a Ch #7 and a Ch #15, respectively. User information 310 associated with a UserC may be associated with message threads 320 corresponding to a Ch #7 and a Ch #22, respectively. In this case, the participants of a chat room associated with the message thread 320 corresponding to the Ch #7 are the UserA, the UserB, and the UserC. Work objects 330 corresponding to an Obj #1, . . . , an Obj #M, respectively, may be generated through the corresponding chat room in association with the participants.

The message thread processing unit 220 receives a work object 330, including a work producer, a work processor, and work contents, through a chat room associated with a message thread 320. In one embodiment, the message thread processing unit 220 may access the message thread memory region 214 associated with a corresponding user through specific user information 310 (e.g., the UserA) associated with a user terminal (e.g., 120a) based on user information 310 read from the user memory region 212, may check message threads (e.g., the Ch #2 and the Ch #7), may receive a work object 330 (e.g., Obj #1) through a chat room associated with one (e.g., Ch #7) of the message threads 320, and may store the received work object 330 in the work object memory region 216 as a work object 330 associated with the corresponding message thread 320. In this case, the work object 330 includes a work producer who requests a work, a work processor who performs the work, and work contents, and may further include at least one of a work deadline, information about whether a point is provided or not, and all the matters related to the work contents.

When a work object 330 is received, the message thread processing unit 220 processes work object operation on a message thread 320. In one embodiment, when a specific work object 330 is received through a chat room associated with a specific message thread 320, the message thread processing unit 220 may add the specific work object 330 to the specific message thread 320 as a work message and process work object operation on the specific message thread 320.

The message thread processing unit 220 may generate a message thread 320 represented in a messenger which is in common used between a work producer and a work processor. In one embodiment, the message thread 320 may be represented as a pair of a work message and a chat message in the messenger implemented through the user terminal 120. More specifically, the message thread processing unit 220 may associate the current work processing state S520 of a work object 330 with a message thread 320 so that a work producer and a work processor can recognize the current work processing state S520 through the message thread 320. In relation to the work object 330, the message thread processing unit 220 may represent a work message by writing a request for a work progress by the work producer, work acknowledgement, and a work-related response by the work processor, and may represent a chat message by writing a chat associated with the work progress. Furthermore, whenever the current work processing state S520 of a work object 330 is changed, the message thread processing unit 220 may notify the participants of a corresponding chat room of the work object 330 by adding the work object 330 to a corresponding associated message thread 320 as a work message.

For example, a work producer may instruct, request or evaluate a work with respect to a work processor through a work message. The work processor may send a work execution response and a work completion response through the work message. That is, the work instruction or request by the work producer may correspond to a request for a work progress. The work evaluation by the work producer may correspond to work acknowledgement. The work execution response and work completion response by the work processor may correspond to work-related responses. Furthermore, a work producer and a work processor may perform a question and answer regarding a corresponding work through a chat message in relation to a work object 330 or may share information related to the corresponding work. The work producer and the work processor may write a chat message or post in order to exchange questions and answers and pieces of information regarding a work in relation to the corresponding work object 330. The message thread processing unit 220 may generate a message thread and may provide the message thread to user terminals 120 associated with the work producer and the work processor. When the chat message or post is received through a chat room, the message thread processing unit 220 may provide chat message notification to a participant terminal associated with the corresponding chat room. The messenger of the user terminal 120 may display the chat message. That is, the message thread processing unit 220 can improve efficiency of communication between the work producer and the work processor by providing the chat message or post which can be shared by the work producer and the work processor.

The message thread processing unit 220 may provide a user terminal 120 with a work object list 400 including a chat room identifier 410 and a work object identifier 420. Such contents are described below with reference to FIG. 4. FIG. 4 is a diagram illustrating the data structure of the user terminal 120 shown in FIG. 1.

More specifically, the message thread processing unit 220 may provide a user terminal 120 with a work object list 400, including a chat room identifier 410 and a work object identifier 420, so that the user terminal 120 enters a chat room in which the user terminal 120 now takes part in through the chat room identifier 410 or accesses a work object 330 that is now in progress through the work object identifier 420. For example, the message thread processing unit 220 may provide the work object list 400 associated with the user terminal 120 through a messenger installed on the user terminal 120.

The message thread processing unit 220 may determine a work object 330 that belongs to work objects 330 associated with a message thread 320 and that is associated with the nearest work deadline to be the representative work object of a chat room, and may provide the representative work object to at least one participant terminal so that the at least one participant terminal displays the corresponding representative work object in a specific region of the corresponding chat room when entering the corresponding chat room. For example, the message thread processing unit 220 may determine a work object 330 that belongs to work objects 330 associated with a message thread 320 and not yet completed and that has the most imminent work deadline based on the current date to be the representative work object of a chat room associated with the corresponding message thread 320, and may display the corresponding representative work object at the top of the corresponding chat room so that user terminals 120 participating in the corresponding chat room can check the corresponding representative work object through the corresponding chat room. If a work object 330 having a past work deadline is present, the message thread processing unit 220 may determine a work object 330 including a work deadline having the greatest number of past days to a representative work object.

The message thread processing unit 220 may provide at least one participant terminal with work progress information in which the work object state of a work object 330 has been statistically summarized so that the at least one participant terminal displays the work progress information through a chat room. In this case, the work object state is indicative of a progress state for each processing step regarding the corresponding work object. The work object state is described in detail in connection with the work object processing unit 230.

The work progress information statistically summarizes and indicates the work object state of the work object 330. For example, the message thread processing unit 220 may provide the user terminal 120 with summarized work progress information about the work object state depending on that the current work object state S520 of the work object 330 is associated with which work object nodes S511-S518 in a work processing diagram 500 so that the user terminal 120 indicates and displays the corresponding work progress information as 'new' S511 (i.e., the state in which a work processor has not been designated), S512 (i.e., the state in which a response has not been received from a work processor and associated with S517), 'doing' (associated with S513), 'done' (associated with S514) and 'check' S516. In this case, 'new' relates to a work object 330 that has been newly generated and indicates a work object 330 whose response from a work processor has not been received or to which a work processor has not been designated. 'Doing' is the state in which a response to a corresponding work object 330 has been received from a work processor and indicates a condition in which the work processor is processing the corresponding work object 330. Done' is the state in which a work processor has completed a corresponding work object 330 and indicates the state in which a response to the completion of a work waits from a work producer. 'Check' indicates the state in which a work producer has checked the completed work object 330 of the work processor.

In one embodiment, in the process of displaying the representative work object of a chat room determined based on the nearest work deadline, the message thread processing unit 220 may provide at least one participant terminal with statistically summarized work progress information about the work object state of the corresponding representative work object so that the at least one participant terminal further displays the work progress information in a specific region of the chat room.

Whenever the work object state of a work object 330 is changed, the message thread processing unit 220 may notify a user of a change in the work object state of the work object 330 through a corresponding chat room by adding the work object 330 to an associated message thread 320 as a work message, and may provide at least one participant terminal with a list of work objects 330 associated with the corresponding chat room and statistically summarized work progress information about the work object state of each of the work objects 330 so that the associated work objects 330 and the work progress information are displayed through a specific menu of the chat room.

The message thread processing unit 220 may recommend a work organization associated with a work producer as the subject of a work processor in the process of receiving a work object 330 associated with a message thread 320. More specifically, when a request to generate a work object 330 associated with a message thread 320 is received through the messenger installed on the user terminal 120, the message thread processing unit 220 may provide the corresponding user terminal 120 with a work organization associated with a user so that the corresponding user terminal 120 recommends and provides a previously received work organization as the subject of a work processor that has not yet been designated in the process of receiving pieces of information related to the work object 330 from the user through an interface. In one embodiment, the work organization may correspond to a group to which the user associated with the corresponding user terminal 120 belongs or a group including a plurality of users set as work processors by the corresponding user by the greatest number during a specific time interval.

In one embodiment, the message thread processing unit 220 may provide a user terminal 120 with the work processing state of all of work objects 330 associated with members of a group to which a user belongs. In this case, the message thread processing unit 220 may provide the user terminal 120 with the work processing state of all of the work objects 330 so that in the process of receiving a work object 330 associated with a message thread 320 as described above, the user terminal 120 recommends a work organization associated with a work producer as the subject of a work processor and displays the entire process of the work objects 33 that are being processed by work processing candidates (i.e., members of a group to which a corresponding user belongs) or that correspond to a work to be processed by the work processing candidates in the future in the form of the work processing diagram 500. Accordingly, the message thread processing unit 220 can provide support so that the user terminal 120 can efficiently select a work processor by providing a work producer with a work object 330 previously assigned to a member of a group to which a user belongs.

In one embodiment, if a group that will perform corresponding work contents is selected before the message thread processing unit 220 receives a work object 330 from a work producer, the message thread processing unit 220 may provide a work processing history, processed by a member (or a work processing candidate) of the selected group, to a user terminal 120 associated with the work producer. In this case, the work processing history performed by the member of the selected group may correspond to information about the work object 330 that has been completed up to now by the member of the corresponding group. Accordingly, the message thread processing unit 220 can provide support by providing the work processing history, performed by the member of the selected group, to the user terminal 120 associated with the work producer so that the work producer can efficiently select a work processor suitable for performing the work contents of the corresponding work object 330 with reference to the work processing history.

In one embodiment, in the process of receiving a work object 330 associated with a work evaluation point through the messenger, the message thread processing unit 220 may check whether the corresponding work evaluation point for a work producer can be paid. For example, regarding the work evaluation point of a work object 330 set by a user "Seo Hyun-dong", the message thread processing unit 220 may check the amount of holding of the work evaluation point for the user "Seo Hyun-dong." If, as a result of the check, the amount of holding is found to be sufficient, the message thread processing unit 220 may determine that the user "Seo Hyun-dong" can pay the work evaluation point so that the work object 330 associated with the corresponding work evaluation point is received. In one embodiment, the work evaluation point may correspond to commodities indicative of an exchange ratio of the commodities and money which may be actually used by users.

In the aforementioned embodiment, if it is determined that the user can pay the work evaluation point, the corresponding work object 330 is completed and thus the provision of the corresponding work evaluation point is approved by the work producer, the message thread processing unit 220 may provide a work processor with the corresponding work evaluation point in such a way as to subtract the corresponding work evaluation point from the amount of holding of the work evaluation point of the work producer and to add the corresponding work evaluation point to the amount of holding of the work evaluation point of the work processor.

In the aforementioned embodiment, if the amount of holding of the work evaluation point of the work producer is found to be insufficient, the message thread processing unit 220 may check the possibility of credit transaction of the work producer or a group to which the work producer belongs. If, as a result of the check, the possibility of credit transaction is found to be possible, the work object 330 associated with the corresponding work evaluation point may be received. If, as a result of the check, the possibility of credit transaction is found to be impossible, the message thread processing unit 220 may notify the corresponding user terminal 120 that the reception of the corresponding work object 330 cannot be performed because requirements for the amount of holding of the work evaluation point and the possibility of credit transaction are insufficient. In this case, the credit transaction can support that the work object 330 associated with the work evaluation point is previously generated depending on the credit of the work producer or the group to which the work producer belongs although the amount of holding of the work evaluation point of the work producer is insufficient.

Figure 5:
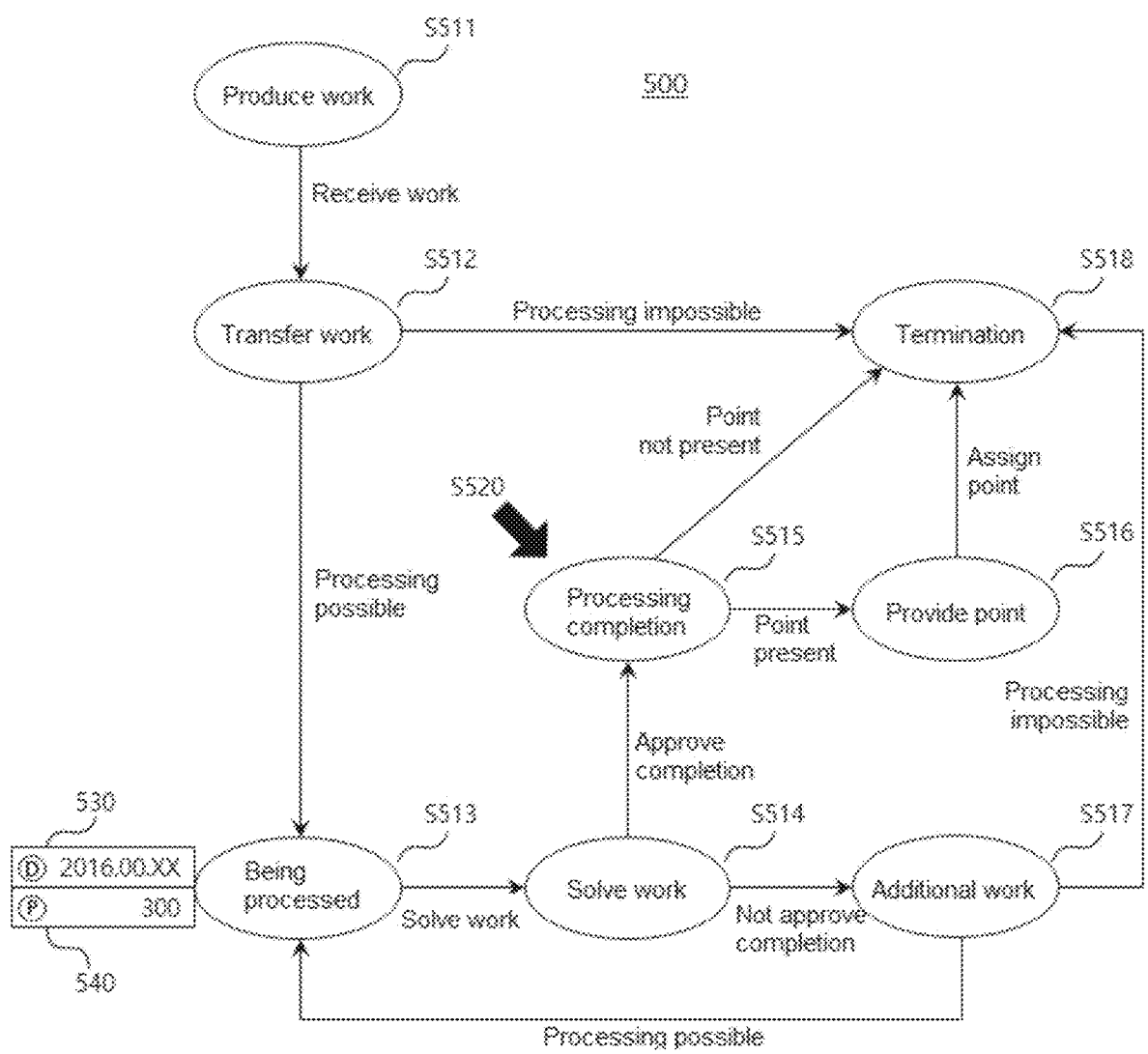
FIG. 5 is a diagram illustrating the process of processing, by the work object processing apparatus of FIG. 1, the work object state of a work object in a work processing diagram.

The work object processing unit 230 processes the work object state of a work object 330, changed in the work processing diagram 500, based on a work interaction between a work producer and a work processor. Such contents are described below with reference to FIG. 5. FIG. 5 is a diagram illustrating the process of processing, by the work object processing apparatus 110 of FIG. 1, the work object state of the work object 330 in the work processing diagram 500.

More specifically, when the work object 330 is received, the work object processing unit 230 may associate the current work processing state S520 with the work processing diagram 500 and may determine a predetermined work processing state by incorporating a request by one of the work producer and the work processor and a request by the other of the work producer and the work processor into the work processing diagram 500. In this case, the work processing diagram 500 may define the entire work processing flow and current work processing state S520 of the corresponding work object 330. The work processing diagram 500 may include one or more work object nodes S511-S518. The work object processing unit 230 may define the progress of the corresponding work object 330 within the entire work processing flow by associating the current work processing state S520 with the one or more work object nodes S511-S518.

Figure 6:
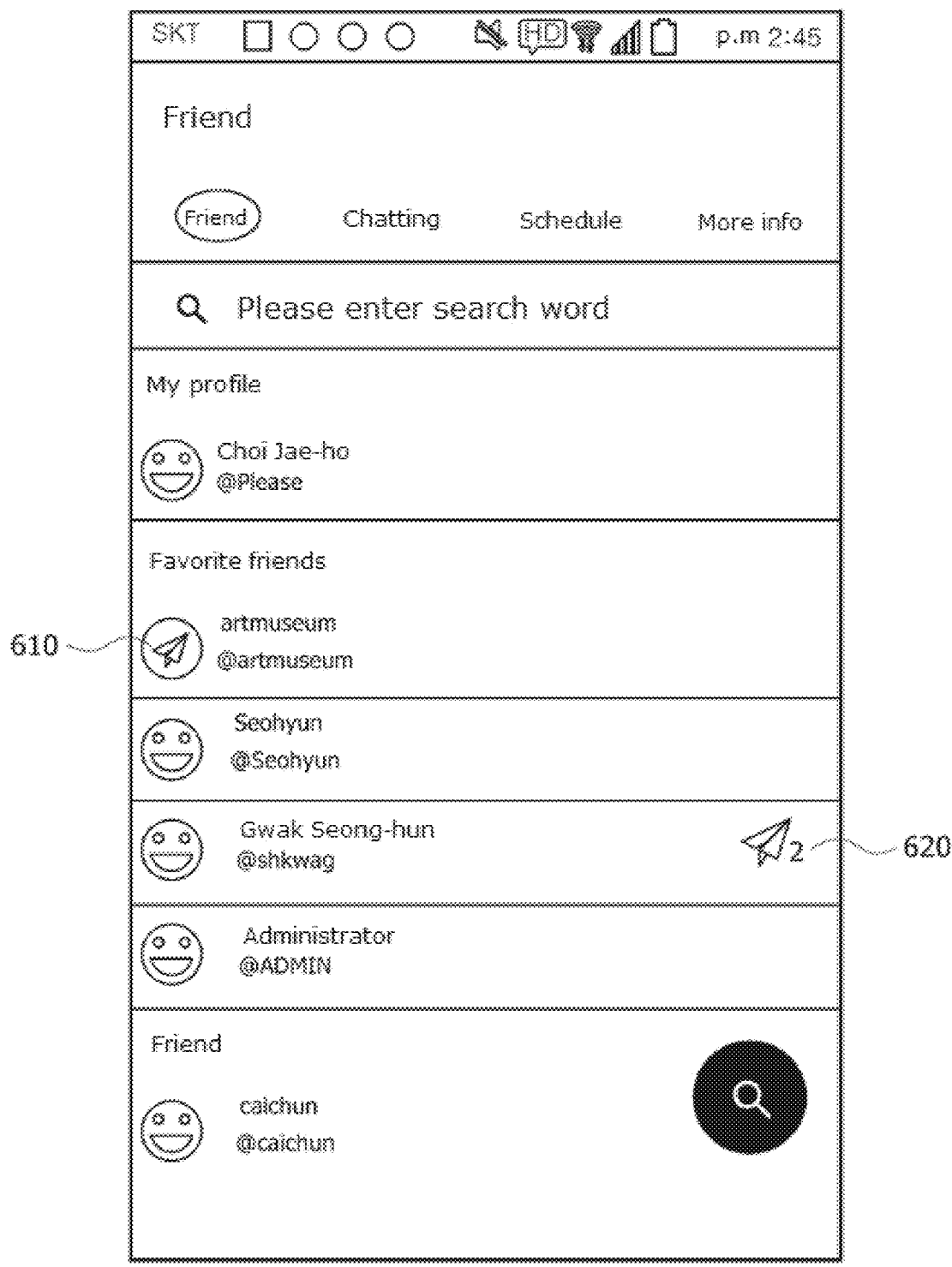
FIG. 6 is a diagram illustrating a friend list in a messenger implemented by the user terminal of FIG. 1.

When the work processing state is determined, the work object processing unit 230 may provide work processing state information to the work producer so that a work processing state image associated with the work processing state is incorporated into a profile image of the work processor. Such contents are described below with reference to FIG. 6. FIG. 6 is a diagram illustrating a friend list in the messenger implemented by the user terminal 120 of FIG. 1.

More specifically, the work object processing apparatus 110 may send a friend list, including the profile of a user associated with a user terminal 120 and the profiles of friends of the registered user, to the user terminal 120. The user terminal 120 may provide a friend list interface that responds to a user input through the messenger based on the received friend list, and may display a friend item, including at least one of a profile name and profile image regarding a friend and a work processing state image, in the received friend list through the friend list interface. In this case, the profile name corresponds to a name or nickname set by the user.

The work object processing apparatus 110 can provide support so that the user terminal 120 provides a work processing state image 610 or before-check request notification 620 through the transmission. In this case, the work processing state image 610 corresponds to an image associated with the current work processing state S520 of a corresponding work object 330. If a new work object 330 is generated or a new work object 330 is instructed, it may be provided to the profile photo of a specific friend or his or her own profile photo.

In one embodiment, if a work object 330 associated with a friend is present, the work object processing unit 230 can provide support so that the user terminal 120 checks whether a profile image of the friend has been registered, provides a work processing state image 610 as the profile image if, as a result of the check, the profile image is found to have not been registered, and overlaps the work processing state image 610 and the profile image if, as a result of the check, the profile image is found to have been registered.

In this case, the work processing state image 610 may include a work transmission image and a work reception image and may be determined depending on the current work processing state S520 of the work object 330. More specifically, when a work object 330 in which a user associated with a user terminal 120 has been designated as a work processor is received, the work object processing unit 230 can provide support so that the corresponding user terminal 120 can substitute a profile image of a corresponding friend with a work processing state image 610 corresponding to a work reception image and overlap the profile image and the work processing state image 610 and thus the user can check the corresponding work object 330. Furthermore, when a work object 330 in which a user associated with a user terminal 120 has designated a specific friend as a work processor is received, the work object processing unit 230 may substitute a profile image 610 of the specific friend with a work processing state image 610 corresponding to a work transmission image or overlap the profile image 610 and the work processing state image 610 so that the user is aware of whether the specific friend has checked the work object 330.

In another embodiment, when a work object 330 in which a user associated with a user terminal 120 has been designated as a work processor or a work producer is received, the work object processing unit 230 can provide support so that the corresponding user terminal 120 posts before-check request notification 620 on the right of a friend list associated with the corresponding work object 330 in order to provide notification of whether a work instruction is present before a work object 330 associated with a corresponding friend is checked and the number of works before the check.

If a work deadline has been designated in a work object 330, the work object processing unit 230 may provide work deadline information to a work producer so that a work deadline image associated with the work deadline is additionally incorporated into a profile image of a work processor. In one embodiment, the work object processing unit 230 may provide work deadline information, designated in a corresponding work object 330, to the user terminal 120 through the work object list 400 so that the user terminal 120 overlaps a work deadline image (e.g., 'D-5' having a work deadline of 5 days) on the lower side of a profile image of a work processor.

Figure 7:
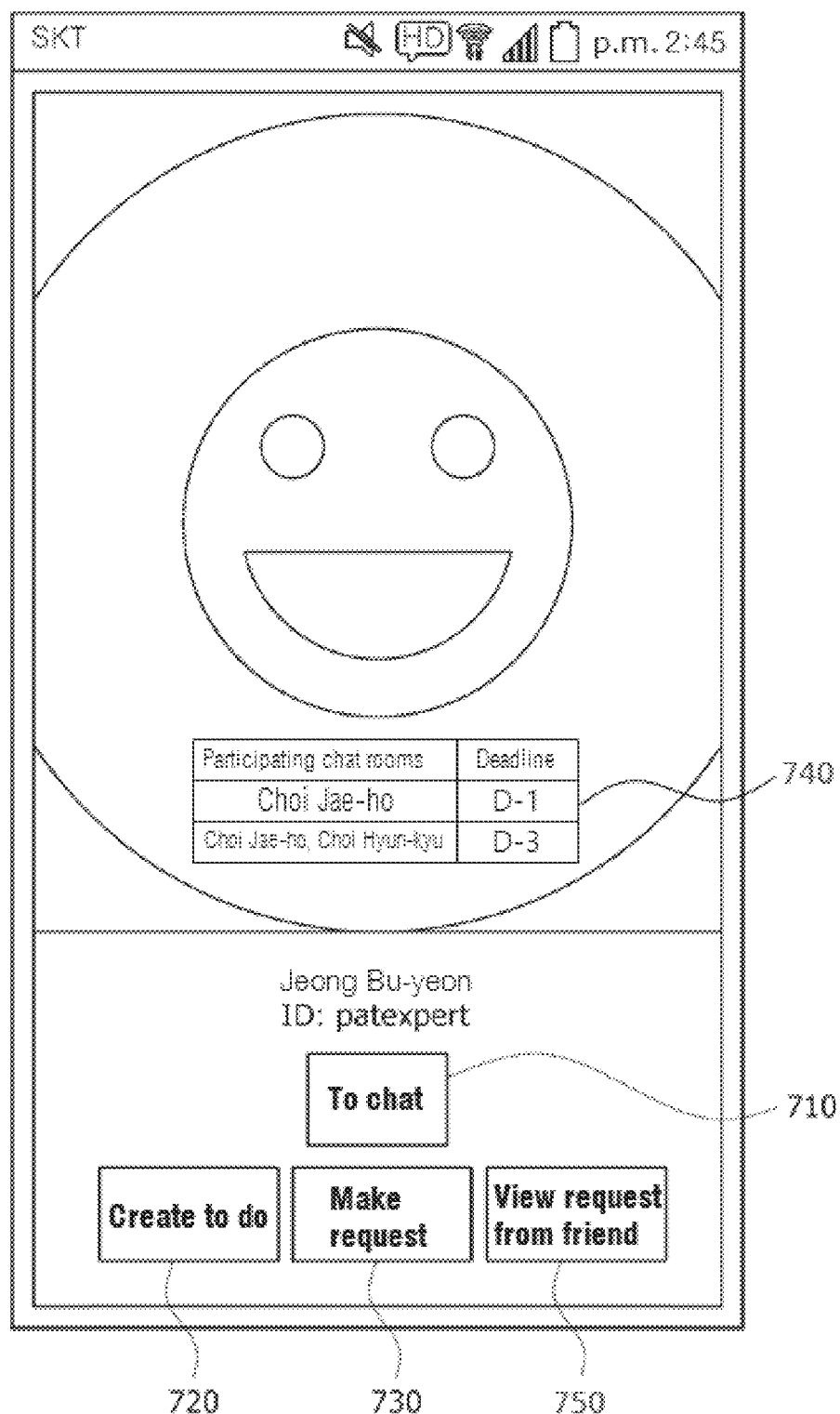
FIG. 7 is a diagram illustrating a menu regarding selected friends of the messenger implemented by the user terminal of FIG. 1.

When a specific friend of a friend list is selected through the messenger installed on the user terminal 120, at least one chat room is provided in order of the deadline, and a specific chat room is selected, the work object processing unit 230 may receive a work object 330 through the specific chat room. More specifically, the work object processing unit 230 may provide a user terminal 120 with a friend list associated with the user terminal 120. When a specific friend of the friend list is selected through the messenger installed on the user terminal 120, the work object processing unit 230 can provide support so that the user terminal 120 can detect at least one chat room which is associated therewith and also associated with the selected specific friend and that chat room lists and chat room identifiers for entering corresponding chat rooms are provided in order of a chat room that belongs to the detected chat rooms and that is associated with a work object 330 having the nearest deadline from the current time. For example, when a specific friend is selected in the user terminal 120 as shown in FIG. 7, the work object processing unit 230 can provide support so that a deadline-based association chat room list 740 regarding at least one chat room which is associated with the user terminal 120 and also associated with the selected specific friend is displayed and a selected chat room is entered in response to user selection.

When a specific work date in a work schedule 1210 is selected through the messenger installed on the user terminal 120 and a specific chat room of one or more chat rooms is selected, the work object processing unit 230 may receive a work object 330 through the specific chat room. More specifically, the work object processing unit 230 may provide a user terminal 120 with work schedule information about work objects 330 associated with the user terminal 120 so that the user terminal 120 displays the work schedule 1210 in the form of an electronic calendar based on the received work schedule information. In this case, the work schedule 1210 may be represented in the form of an interface based on the schedule of the electronic calendar in which the work deadlines of the respective associated work objects 330 can be checked by year, month and day.

Figure 12:
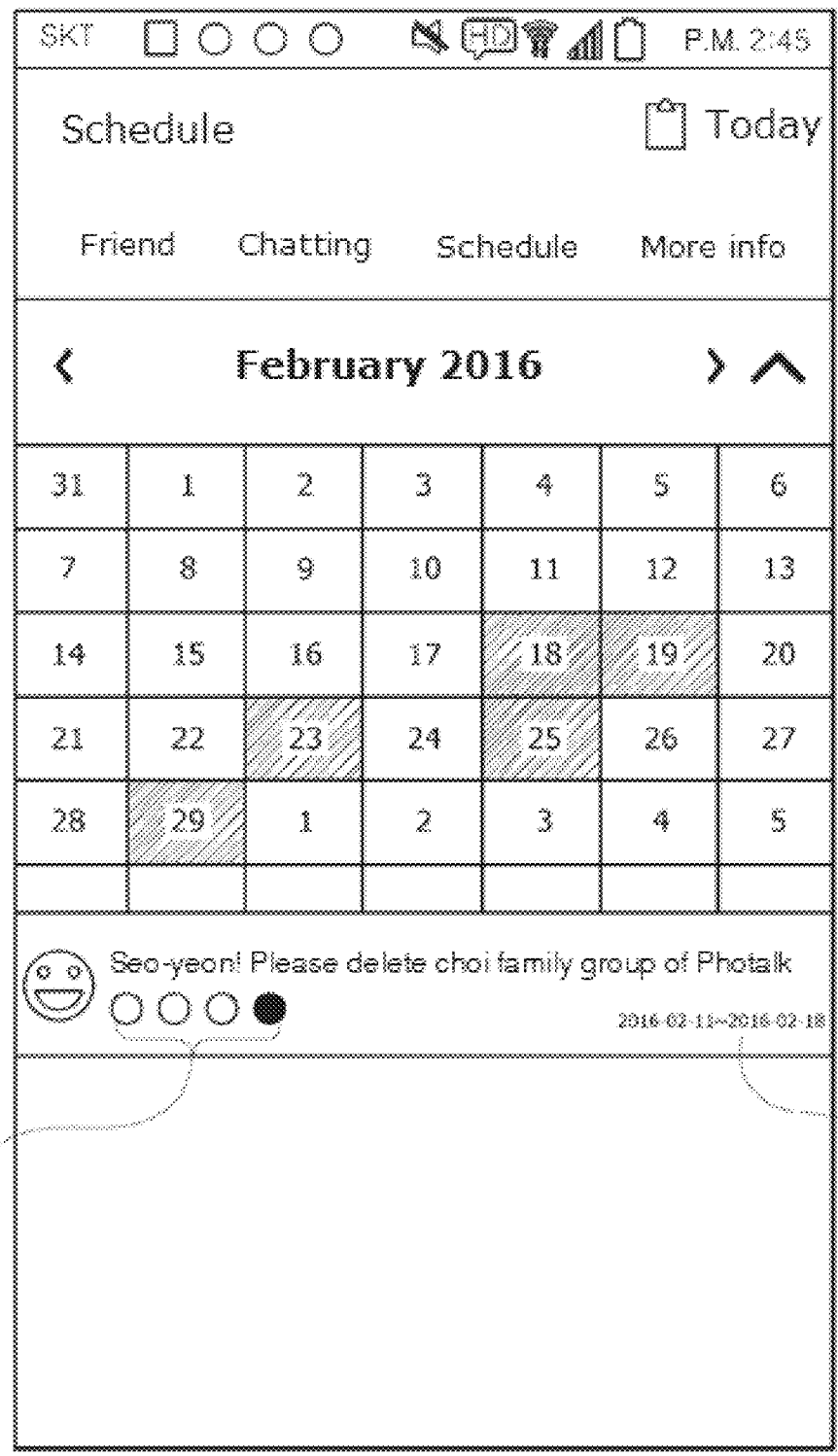
FIG. 12 is a diagram illustrating an interface based on a work schedule in the messenger implemented by the user terminal of FIG. 1.

In one embodiment, when a specific work date is selected in the work schedule 1210 through the messenger installed on the user terminal 120, the work object processing unit 230 can provide support so that the user terminal 120 may display a list regarding at least one work object 330 in which the selected work date has been designated as a work deadline in a specific portion of the messenger, may enter a chat room associated the at least one work object 330 through the displayed list regarding the at least one work object 330, and may receive a new work object 330 from a user through the entered chat room. For example, as shown in FIG. 12, when a user selects a specific date in the work schedule 1210, the work object processing unit 230 may provide a work object list 1220 based on a work schedule, including one or more work objects 330 in which corresponding dates have been set as work deadlines, through the messenger installed on the user terminal 120. The work object list 1220 based on the work schedule may be disposed on the lower side of the work schedule 1210.

In another embodiment, when a specific work date is selected in the work schedule 1210 through the messenger installed on the user terminal 120, the work object processing unit 230 can provide support so that the user terminal 120 may display a list regarding at least one chat room associated with a work object 330 in which the selected work date has been designated as a work deadline, may enter a corresponding chat room when one chat room of the displayed list regarding the at least one chat room is selected, and may receive a new work object 330 from a user through the entered chat room. For example, when a user selects a specific date in the work schedule 1210, the work object processing unit 230 may provide a chat room list based on a work schedule, including one or more chat rooms in which corresponding dates have been set as work deadlines, through the messenger installed on the user terminal 120. The chat room list based on the work schedule may be disposed on the lower side of the work schedule 1210.

When a work evaluation point assigned based on the rights of a work producer is associated with a work object 330 and a work object state is detected as a completion state indicating that a work solution request has been received by a work processor and that a processing completion response has been provided by a work producer, the work object processing unit 230 may provide the work processor with the work evaluation point. In one embodiment, when a work processor notifies a work producer of the completion of a work through a message thread 320 in relation to a work object 330 associated with a work evaluation point, the work object processing unit 230 questions the work producer as to whether the work producer can provide the work evaluation point and may provide the work processor with a work evaluation point up to the upper limit of the corresponding work evaluation point based on the approval of the work producer. For example, when the processing of a work is completed, the work object processing unit 230 may question the work producer as to how many point of a work evaluation point designated as 10 points will be actually provided to a work producer. If the work producer has designated 10 points as the work evaluation point, but has not yet evaluated the work, the work object processing unit 230 can provide support so that a corresponding user terminal 120 displays a work evaluation point regarding a corresponding work object 330 as '-/10' through the messenger. Furthermore, if the work producer has designated the 10 points and has approved the provision of the 10 points, the corresponding user terminal 120 may display the work evaluation point regarding the corresponding work object 330 as '10/10'. If the work producer has designated the 10 points, but has approved the provision of 5 points, the corresponding user terminal 120 may display the work evaluation point regarding the corresponding work object 330 as '5/10'. If the work producer has designated the 10 points, but has approved the provision of 0 point, the corresponding user terminal 120 may display the work evaluation point regarding the corresponding work object 330 as '0/10'. When the provision of the work evaluation point is approved by the work producer through a message thread (e.g., a work message of a messenger), the work object processing unit 230 may provide the work processor with the work evaluation point.

For example, when the current work object state S520 of a specific work object 330 for which a work evaluation point has been set is detected as being associated with the work object node S516 defined as a processing completion state, the work object processing unit 230 may determine the progress of the corresponding work object 330 to be the processing completion state within the entire work processing flow, may update a total of the current work evaluation point of a user associated with a work processor by adding the corresponding work evaluation point to the total of the current work evaluation point of the user, and may notify the update of a user terminal 120 associated with the work processor.

In one embodiment, when a work object 330 associated with a work evaluation point is received through the messenger, the work object processing unit 230 may notify a user terminal 120 associated with a work processor whether the corresponding work object 330 has been evaluated. For example, when a work producer notifies a work processor of a work object 330 associated with a work evaluation point of '300' through a user terminal 120, the work object processing unit 230 may notify the user terminal 120 associated with the work processor that the corresponding work object 330 is to be evaluated by the work producer and the work evaluation point is provided when the processing of a work is completed, and may transfer the degree of difficulty or the degree of importance of the work object 330 to the user terminal 120.

When a work processor notifies a work producer of the completion of a work through a message thread 320 in relation to a work object 330 not including a work evaluation point, the work object processing unit 230 may request work evaluation from the work producer. When the work evaluation is completed by the work producer through work acknowledgement (e.g., a 'check' button in a messenger), the work object processing unit 230 may terminate the corresponding work. For example, when the work evaluation is completed by the work producer through work acknowledgement (e.g., the 'check' button of the messenger), the work object processing unit 230 may update the current work processing state S520 in association with the [processing completion] work object node S516 or may update the current work processing state S520 in association with the [termination] work object node S518 without providing the work evaluation point.

If at least one next work object node that may be performed in a step after a work object node associated with the current work processing state S520 is present in the work processing diagram 500 when a work producer or a work processor writes a work message, the work object processing unit 230 may request a work-related response related to the selection of a work progress through the corresponding work message. For example, if the current work processing state S520 is associated with the [work solution] work object node S514 through the work completion response (e.g., the 'done' button) of a work processor, the work object processing unit 230 may request a work-related response from a corresponding work producer or a work processor so that the corresponding work producer or the work processor selects one of the [additional work] work object node S515 and the [processing completion] work object node S516 which may be subsequently performed after the [work solution] work object node S514, and may update the current work processing state S520 based on a work-related response received from the corresponding work producer or the work processor.

In one embodiment, when a work object 330 for which stepwise cooperation processing by a plurality of work processors is required is received, the work object processing unit 230 may include the subject of work execution in a work object node included in the work processing diagram 300 and may notify each of the plurality of work processors of each of sub-works for the stepwise cooperation. More specifically, if a work object 330 requires stepwise cooperation processing, it may include a plurality of sub-works, and the plurality of sub-works may be processed by different work processors. For example, if a work requires two-step cooperation processing, a first sub-work may be performed by a first work processor and a second sub-work may be performed by a second work processor after the first sub-work is completed. That is, the work object processing unit 230 may notify each of a plurality of work processors of each of a plurality of sub-works, and each of the plurality of work processors may check the progress of a sub-work that is performed by another processor through a message thread 320.

The work object processing unit 230 may access the memory unit 210, may analyze a message thread 320 updated by a work producer or work processor, and may update the current work processing state based on the work processing diagram 500. In one embodiment, the user terminal 120 may include a 'doing' button, a 'done' button, and a 'check' button that support the writing of a work-related response or work acknowledgement in a messenger. The work object processing unit 230 may receive a work interaction between a work producer and a work processor through the 'doing' button, the 'done' button or the 'check' button in a messenger of the user terminal 120.

More specifically, the work object processing unit 230 may receive a work execution response from a work processor through the 'doing' button of the user terminal 120, may receive a work completion response from a work processor through the 'done' button, and may receive work acknowledgement from a work producer through the 'check' button. In this case, the work execution response means that a work processor is processing a requested work. The work completion response means that a work processor has completed a requested work. The work acknowledgement means that a work producer has reviewed and evaluated a work completed by a work processor.

In one embodiment, when a work execution response (e.g., the 'doing' button) is received from a work processor, the work object processing unit 230 may associate the current work processing state S520 with the [processing] work object node S513. When a work completion response (e.g., the 'done' button) is received, the work object processing unit 230 may associate the current work processing state S520 with the [work solution] work object node S514. When work acknowledgement (e.g., the 'check' button) is received from a work producer, the work object processing unit 230 may associate the current work processing state S520 with the [processing completion] work object node 516.

If a work deadline has been designated in a work object 330, the work object processing unit 230 may previously notify a work processor associated with the corresponding work object 330 of the work deadline by including the work deadline in a work object node of the work processing diagram 500. For example, the work object processing unit 230 may include a work deadline (e.g., 530 in FIG. 5) "Feb. 11, 2016" in the [processing] work object node 513, and may previously notify a work processor of the corresponding work deadline prior to a specific period (e.g., one day or one week) from the work deadline so that work processing can be smoothly performed. In the aforementioned embodiment, if a work evaluation point (e.g., 540 in FIG. 5) has been assigned to a work object 330, the work object processing unit 230 may also notify the corresponding work evaluation point in the process of previously notifying a work processor associated with the corresponding work object 330 of a work deadline by further including the corresponding work evaluation point in a work object node (e.g., the [processing] work object node 513) in the work processing diagram 500.

In one embodiment, the work object processing unit 230 may determine whether a work object 330 satisfies a remembrance condition in the process of previously notifying a work processor associated with the corresponding work object 330 of a work deadline. If, as a result of the determination, it is determined that the work object 330 satisfies the remembrance condition, the work object processing unit 230 may generate a remembrance message 1310 through a chat room associated with the corresponding work object 330 and provide the remembrance message 1310 to the corresponding work processor. In this case, the remembrance condition is at least one criterion condition for determining whether remembrance regarding at least one work object 330 is necessary. In one embodiment, the remembrance condition may be determined based on at least one of statistically summarized work progress information about the work object state of a work object 330 and a work deadline. For example, the work object processing unit 230 may determine that remembrance satisfying a remembrance condition is necessary from a day after the day when a progress state according to work progress information associated with a specific work object 330 becomes a 'new' state to the day when the 'new' state changes into a 'doing' state if the progress state according to work progress information is the 'new' state, may determine that remembrance satisfying a remembrance condition is necessary from a day before a deadline to the day when a 'doing' state changes into a 'done' state if the progress state is the 'doing' state, and may determine that remembrance satisfying a remembrance condition is necessary from a day after the day when a progress state changes into a 'done' state to the day when the 'done' state changes into a 'completion' state if the progress state is the 'done' state. If the progress state corresponds to the 'check' state, the work object processing unit 230 may determine that remembrance is not necessary.

In one embodiment, if it is determined that remembrance is necessary in the process of previously notifying a work processor associated with a work object 330 of a work deadline, the work object processing unit 230 may generate a remembrance message 1310, including summary information about at least one of a work producer, the work processor, work contents, a work deadline, a work evaluation point, and work progress information regarding the corresponding work object 330 and a state change button capable of changing the progress state of the corresponding work object 330 into a next state, and may provide the remembrance message 1310 to the work processor through an associated chat room. When a change in the progress state of the corresponding work object 330 is requested by the user terminal 120 through the remembrance message 1310, the work object processing unit 230 may incorporate such a change into the work processing diagram 500 of the corresponding work object 330 and may update the current work object state 520 by changing the work object state into a next state.

In one embodiment, in the process of previously notifying a work processor associated with a work object 330 of a work deadline, the work object processing unit 230 may determine remembrance urgency based on information about the work progress of the work object 330 and a difference day up to a work deadline. If, as a result of the determination, it is determined that the remembrance is urgent, the work object processing unit 230 may add visual indication to some of the remembrance message 1310 so that an urgent remembrance message is distinguished from a common remembrance message. For example, the work object processing unit 230 may determine that a work object 330 is urgent from a day before a work deadline if a progress state based on information about the work progress of the work object 330 is a 'new' state, may determine that a work object 330 is urgent from that day of a work deadline if a progress state based on information about the work progress of the work object 330 is a 'doing' state, and may determine that a work object 330 is urgent from a day after a work deadline if a progress state based on information about the work progress of the work object 330 is a 'done' state.

In one embodiment, in the process of previously notifying a work processor associated with a work object 330 of a work deadline, the work object processing unit 230 may detect the time zone of the corresponding work processor, and may delay the addition of a remembrance message to a message thread 320 associated with a corresponding chat room until the time when the corresponding work processor can receive the remembrance message. In this case, the time zone corresponds to a local time, that is, a basis in performing a specific work. For example, the work object processing unit 230 may detect the current time based on the area where a user terminal 120 associated with a corresponding work processor is located as the time zone of the corresponding work processor. In this case, the work object processing unit 230 may check the time when the corresponding work processor can receive a remembrance message based on the time zone. For example, the work object processing unit 230 may derive the time when a corresponding work processor can receive a remembrance message through operation on the basis of the local time of a detected time zone based on a predetermined specific time interval (e.g., a local time based on the area where a user terminal 120 is located, for example, from a.m. 9 to p.m. 6) in response to a request from the user terminal 120 associated with the corresponding work processor. Furthermore, if the time when a remembrance message 1310 was generated does not correspond to the time when a corresponding work processor can receive a remembrance message, the work object processing unit 230 may temporarily store the corresponding remembrance message 1310 in the memory unit 210, and may add the corresponding remembrance message 1310 to a message thread 320 associated with the corresponding remembrance message 1310 at the time (e.g., a.m. 9) when a corresponding work processor can receive a remembrance message.

In one embodiment, in the process of previously notifying a work processor associated with a work object 330 of a work deadline based on a time zone, if a fixed request regarding the time zone is not received from the corresponding work processor, the work object processing unit 230 may detect the time zone based on the local time of a user terminal 120 associated with the corresponding work processor. If the fixed request regarding the time zone is received from the corresponding work processor, the work object processing unit 230 may detect the time zone based on the corresponding fixed request. For example, if a corresponding work processor is located in New York of U. S. A on business, the local time of a user terminal 120 associated with the corresponding work processor may be different from a standard time (e.g., the current time in Korean time), that is, a basis in the work object processing unit 230. If a fixed request regarding a time zone is not received from the user terminal 120 of the corresponding work processor, the work object processing unit 230 may detect a local time in New York as the time zone. If a fixed request regarding a time zone including information about a specific local time previously determined by a corresponding work processor is present (e.g., the time zone is fixed to a.m. 11 based on a local time in New York or a.m. 10 in Korean time), the work object processing unit 230 may determine the time zone based on the corresponding local time.

In one embodiment, the work object processing unit 230 may temporarily store at least one remembrance message 1310 generated in association with a specific work processor until a first time based on the time zone of a corresponding work processor, and may add the temporarily stored at least one remembrance message 1310 to a message thread 320 together or sequentially when a second time is reached. For example, the work object processing unit 230 may add remembrance messages 1310, temporarily stored in the memory unit 210 from 12 a.m. to 12 p.m. the day before based on the local time of the area where a user terminal 120 associated with a work processor, to at least one associated message thread 320 at 9 a.m. the next day based on the corresponding local time.

In one embodiment, in the process of providing the remembrance message 1310, if the number of work processors associated with the work object 330 is at least two and the corresponding work processors are associated with the same chat room, the work object processing unit 230 may detect the time zone of each of the work processors, and may provide the remembrance message 1310 through a corresponding chat room at the intersection time of the times when the work processors can receive the remembrance message 1310. In one embodiment, the work object processing unit 230 may cancel a remembrance message 1310 for which a work producer waits or may change the remembrance message 1310 so that it is immediately transmitted through a remembrance sending standby box including remembrance messages 1310 that have been temporarily stored and stand by or can provide support so that the progress state of a corresponding work object 330 is directly changed.

In one embodiment, the work object processing unit 230 may provide each of users included in the user information 310 with a visualized work to-do-today 1400 of a work object set, including at least one work object 330 that is associated with each of the users and that is determined to require remembrance. The work object processing unit 230 may sort or divide the work object set, included in the work to-do-today 1400, based on remembrance urgency or association with each user. For example, the work object processing unit 230 may divide the work to-do-today 1400 into the 'entire request', a 'request made by me', a 'request received by me' and a 'request for which reference has been made' (1440), and may provide such a request to each of a user terminal 120 associated with each user. In one embodiment, when the progress state of at least one work object 330 included in the work to-do-today 1400 is changed, the work object processing unit 230 may incorporate the current work object state 520 of a work processing diagram 500 associated with the work object 330 into the work object 330 by updating the current work object state 520, and may update the work to-do-today 1400 based on the changed work object 330.

The work organization management unit 240 may analyze the data of a group based on information about the corresponding group to which each of users included in the user information 310 belongs, may compute the degree of completion 985 of the work object state of each of a plurality of work objects performed by the corresponding group for each group, and may provide the degree of completion 985 computed for each group to each of the users belonging to the corresponding group. In one embodiment, if the entire group associated with a specific user includes '1 Group' and '2 Group' as in FIG. 9, the work organization management unit 240 may analyze the current work object state S520 of all of work objects 330 performed by the corresponding groups during a specific time interval (e.g., recent 3 months) in relation to the corresponding groups, may compute the degree of completion 985 for each group, and may provide the computed information for each group to each corresponding user terminal 120 so that each user terminal 120 displays the computed information along with each of pieces of group information 980 through a specific portion of a messenger.

In one embodiment, the work organization management unit 240 may compute the degree of completion 985 in accordance with Equation 1 below. For example, if a specific user belongs to '1 Group', the number of work objects 330 associated with the corresponding group is two, one of the two work objects is associated with a work object node regarding the work transfer state S512, and the other thereof is associated with a work object node regarding the processing completion state S516, the work organization management unit 240 may compute the degree of completion of the corresponding group as 50 by averaging 2/8 and 6/8 for the two work objects, and may provide the degree of completion of the corresponding group to each user terminal 120 belonging to the corresponding group '1 Group' so that each user terminal 120 displays information about an affiliated group and the degree of completion of a corresponding group in a specific portion of each messenger.

Degree of completion (%)=$avr$(state index/state index$_{MAX}$)*100   [Equation 1]

In Equation, the state index is determined depending on that the current work object state S520 is associated with which work object node. For example, the state index corresponds to 1 if it is associated with the work object node S511, corresponds to 2 if it is associated with the work object node S512, corresponds to 3 if it is associated with the work object node S517, corresponds to 4 if it is associated with the work object node S513, corresponds to 5 if it is associated with the work object node S514, corresponds to 6 if it is associated with the work object node S515, corresponds to 7 if it is associated with the work object node S516, and corresponds to 8 if it is associated with the work object node S518. The state index$_{MAX}$ corresponds to a maximum value of the state index, and 'avr( )' means operation for calculating values within '( )' in relation to all of associated work objects 330 and averaging the values.

The control unit 250 may control an overall operation of the work object processing apparatus 110, and may control a data flow between the memory unit 210, the message thread processing unit 220, the work object processing unit 230, and the work organization management unit 240. In one embodiment, the control unit 250 may be implemented by the central processing unit (CPU) of the work object processing apparatus 110. When new user information 310, a message thread 320, and a work object 330 are generated or received, the control unit 250 may store the new user information 310, the message thread 320, and the work object 330 in the user memory region 212, the message thread memory region 214 and the work object memory region 216, respectively, and may update and manage them. If necessary, the control unit 250 may read pieces of corresponding information from corresponding memory regions and transfer them to at least one of the message thread processing unit 220, the work object processing unit 230, and the work organization management unit 240.

FIG. 7 is a diagram illustrating the process of displaying, by the user terminal of FIG. 1, a work object through the messenger by communicating with the work object processing apparatus.

Referring to FIG. 7, the messenger implemented by the user terminal 120 may include a chatting button 710, a to-do creation button 720, a make-request button 730, a deadline reference association chat room list 740, and a view-request-from-friend button 750. A user of the messenger may perform chatting with at least one user based on the messenger through the chatting button 710, and may generate a work object 330 to be performed by the user or another user through the to-do creation button 720. For example, a work producer may generate a work object 330 through the to-do creation button 720 and may directly instruct a specific user (ID: patexpert) having a friendship with the work producer on a work. When the specific user to which the work has been assigned completes the corresponding work object 330, the work producer may evaluate the corresponding work object 330 and provide a work evaluation point.

In one embodiment, a work producer may request a work object 330 from a user having a friendship with the work producer or a user belonging to the same group as the work producer or may instruct the user on the work object 330 through the make-request button 730. For example, a work producer may provide the work object processing unit 230 with a work object 330 to be requested from a user (e.g., Jeong Bu-yeon) having a friendship with the work producer through the make-request button 730 of the user terminal 120.

In one embodiment, when a user selects a specific friend included in a friend list, the user may check the deadline reference association chat room list 740 in which at least one chat room associated between the user and the selected friend is provided in order of deadline, and may enter a corresponding chat room by selecting one chat room in the deadline reference association chat room list 740.

Figure 11:
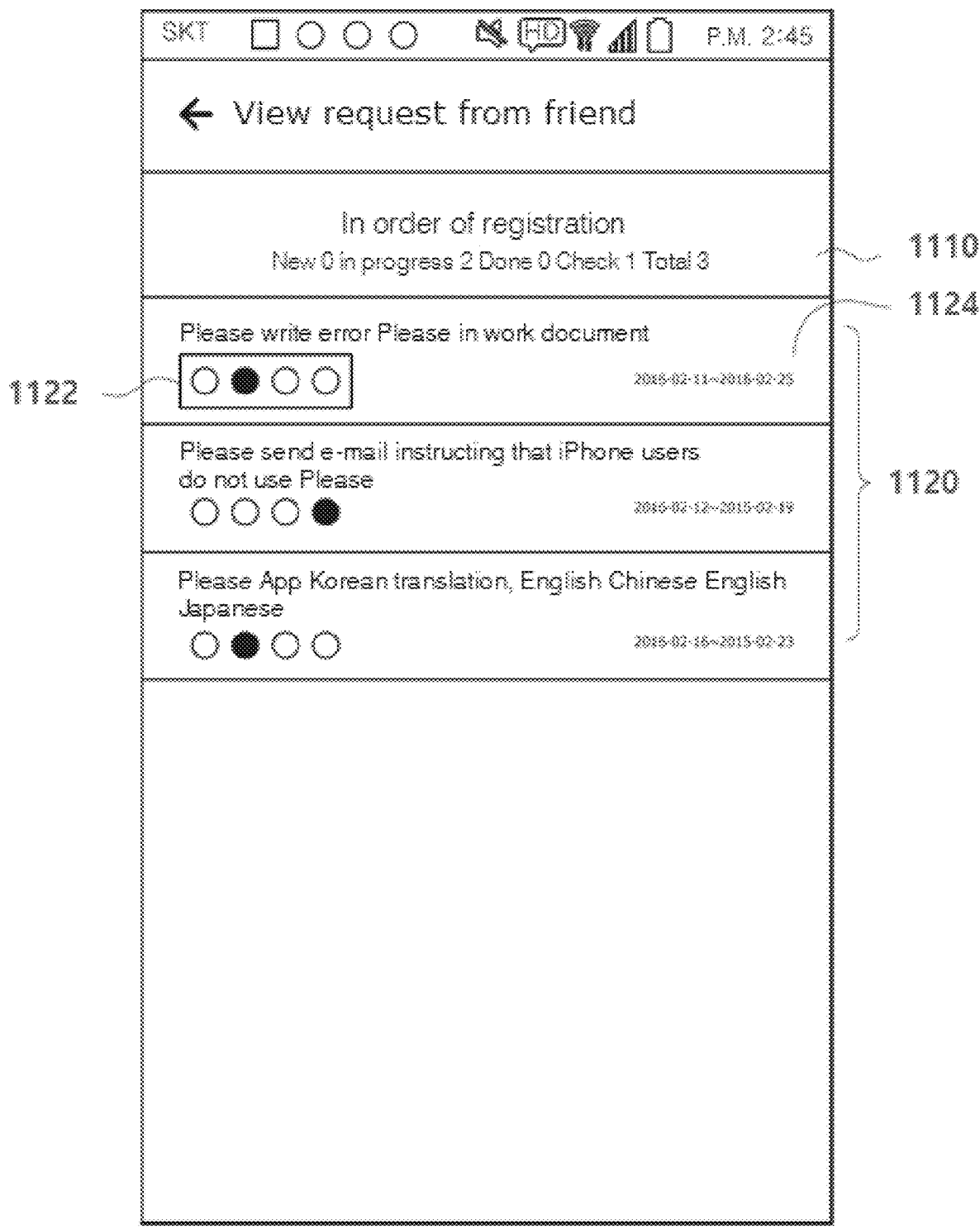
FIG. 11 is a diagram illustrating a work object list associated with a specific friend in the messenger implemented by the user terminal of FIG. 1.

In one embodiment, a user may check a work object 330 which is associated with the user and also associated with a selected friend through the view-request-from-friend button 750. For example, when a user selects the view-request-from-friend button 750, the user may check schematic information and a list of work objects 330 associated with a corresponding friend and the user as shown in FIG. 11. Such contents are described in more detail with reference to FIG. 11.

Figure 8:
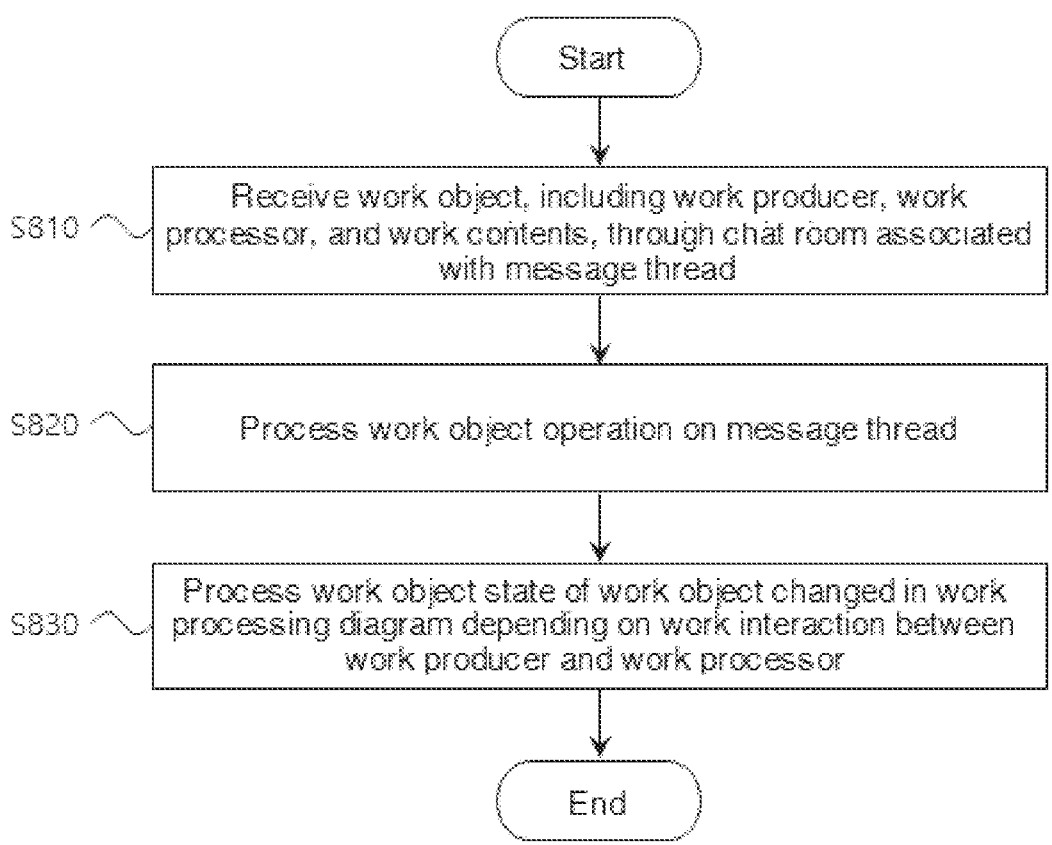
FIG. 8 is a flowchart illustrating the process of processing, by the work object processing apparatus of FIG. 1, a work object.

FIG. 8 is a flowchart illustrating the process of processing, by the work object processing apparatus of FIG. 1, a work object.

In FIG. 8, the message thread processing unit 220 receives a work object 330, including a work producer, a work processor, and work contents, through a chat room associated with a message thread 320 at step S810. When the work object 330 is received, the message thread processing unit 220 processes a work object operation on the message thread 320 at step S820. The work object processing unit 230 processes the work object state of the work object 330 which is changed in the work processing diagram 500 depending on a work interaction between the work producer and the work processor at step S830.

In one embodiment of the present invention, the work object processing apparatus 110 can provide support so that a work producer and a work processor receive a work object 330 through a chat room associated with a message thread 320 and conveniently perform a work instruction, work evaluation, and a work execution response through a work message.

In one embodiment of the present invention, the work object processing apparatus 110 can efficiently perform processing on a work object 330 by incorporating a work interaction between a work producer and a work processor into the work object state of the work object 330 based on the work processing diagram 500.

In one embodiment of the present invention, the work object processing apparatus 110 can improve efficiency of communication between a work producer and a work processor by providing support so that chats regarding a work are exchanged through a work message through which work interactions between the work producer and the work processor can be exchanged and a chat message in which a chat regarding a work is written.

Figure 9:
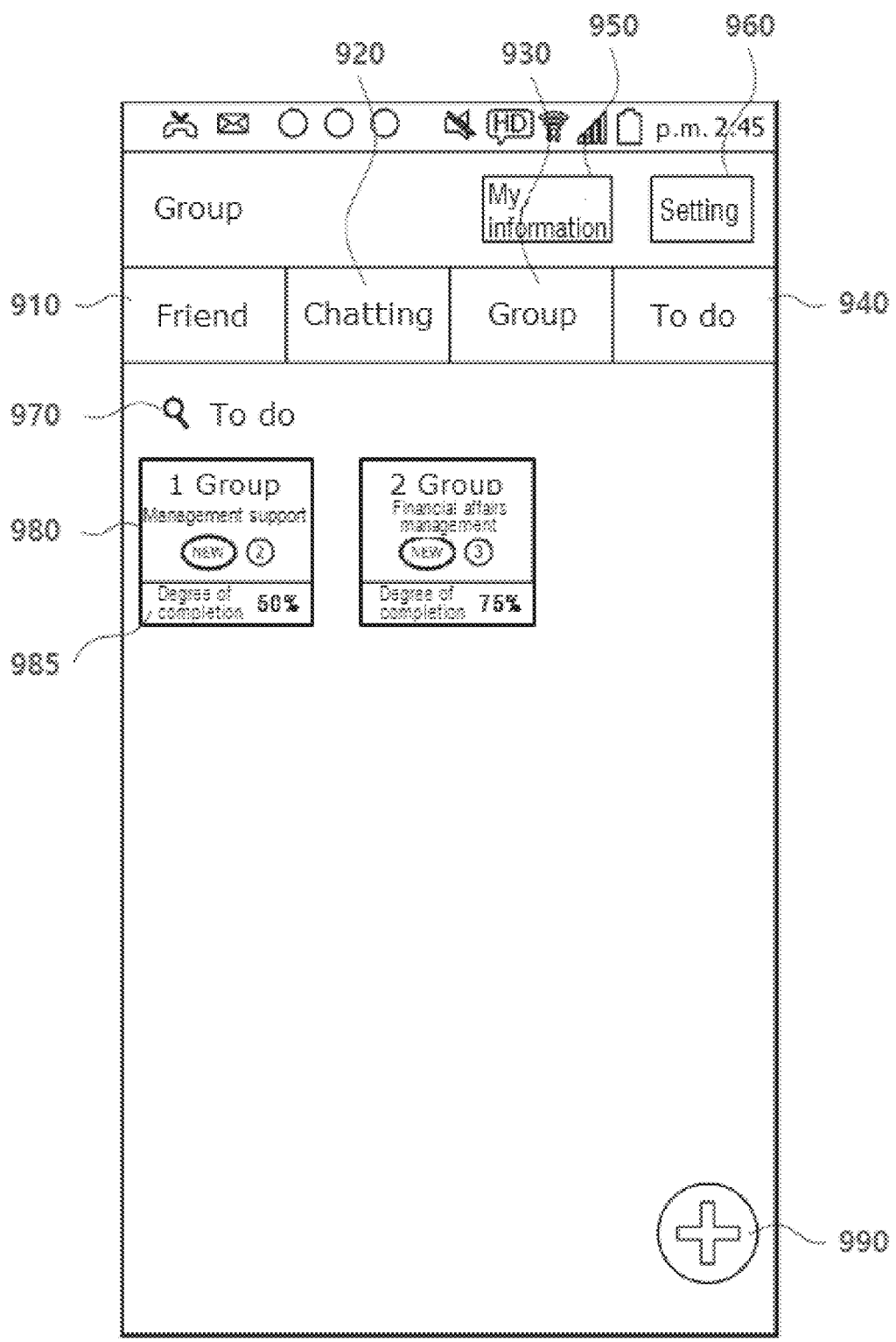
FIG. 9 is a diagram illustrating a list of user groups in the messenger implemented by the user terminal of FIG. 1.

FIG. 9 is a diagram illustrating a list of user groups in the messenger implemented by the user terminal of FIG. 1.

Referring to FIG. 9, the user terminal 120 may transfer messages between users through the messenger. The user terminal 120 may provide the messenger including a friend tab 910, a chat tab 920, a group tab 930, and a to-do tab 940. For example, the messenger implemented through the user terminal 120 may provide a friend addition function, a friend list function, a friend search function, and a friend information function through the friend tab 910. The messenger may transfer messages, including text or/and graphics, between user terminals through the chat tab 920.

In one embodiment, the messenger may provide a group management function that is represented as a combination of at least one user terminal through the group tab 930. For example, the messenger may provide schematic information about a user group 980, the degree of completion 985 for each group, information about whether a new work object 330 has been produced, and the number of work objects 330 through the group tab 930. The messenger may provide a group search function through a search button 970. The messenger may provide information about an associated work object 330 through the to-do tab 940. The messenger may provide the user information 310, associated with the user terminal 120, through a my information button 950. The messenger may provide a setting function regarding a messenger and a question and answer function through a setting button 960. Furthermore, the messenger may provide a group addition function through the group addition button 990.

Figure 10:
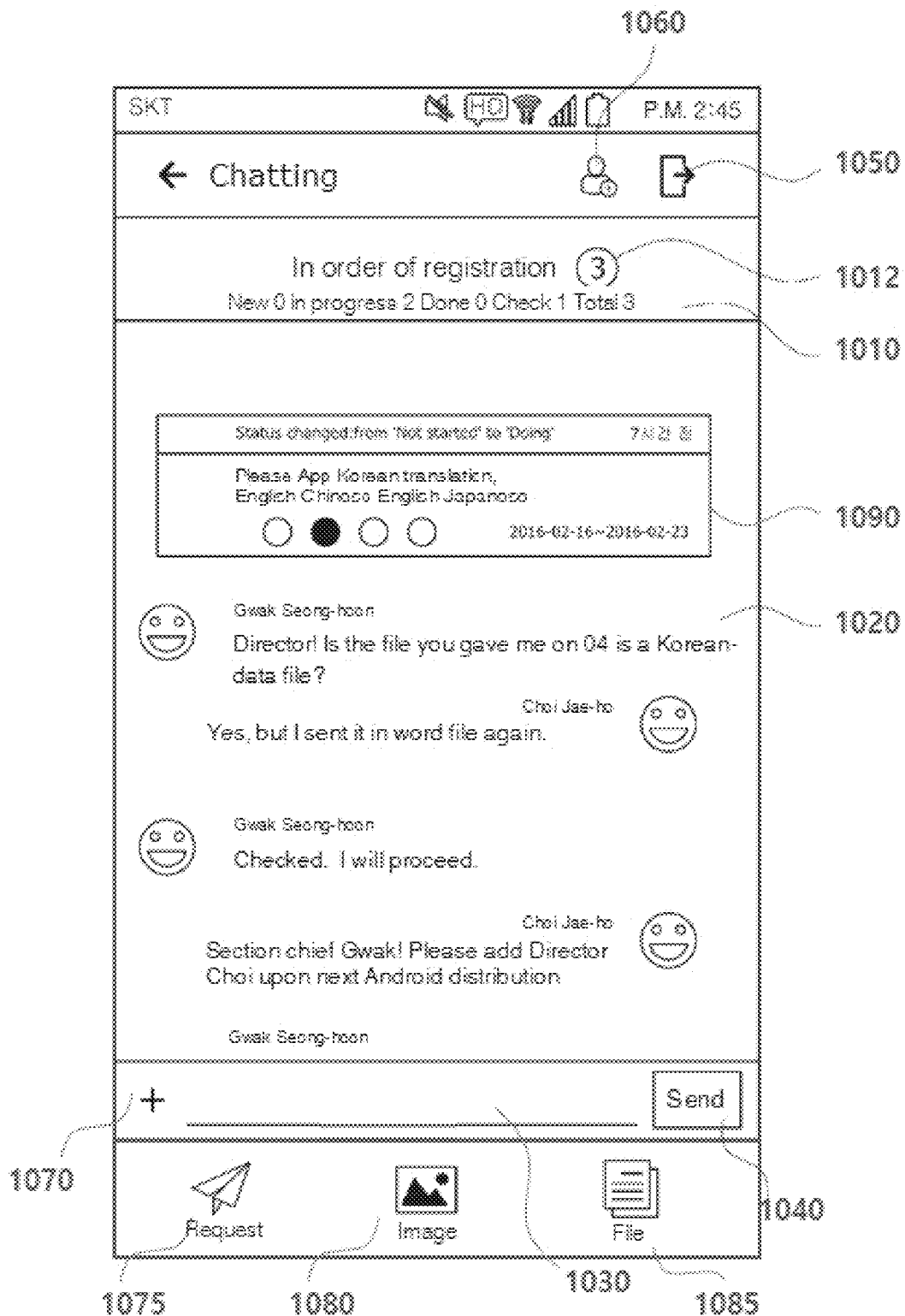
FIG. 10 is a diagram illustrating a chat room of the messenger implemented by the user terminal of FIG. 1 and statistically summarized work progress information about a work object state regarding a work object within the chat room.

FIG. 10 is a diagram illustrating a chat room of the messenger implemented by the user terminal of FIG. 1 and statistically summarized work progress information about a work object state regarding a work object within the chat room.

Referring to FIG. 10, the user terminal 120 may receive statistically summarized work progress information about a work object state regarding at least one work object 330, associated with the user terminal 120, from the work object processing apparatus 110, and may response to a user input based on the work progress information.

The messenger installed on the user terminal 120 may include work object set information 1010, a notification badge 1012, a chat window 1020, a chat message writing box 1030, and a message transmission button 1040. User terminals 12 belonging to a chat room may receive information about work objects 330, associated with the corresponding chat room, through the work object set information 1010 from the work object processing apparatus 110. For example, the user terminal 120 may sort the plurality of work objects 330 by the progress state according to work progress information, and may provide the plurality of work objects 330 to a chat room. The user terminal 120 may sort the plurality of work objects 330 by the progress state according to work progress information based on the work object set information 1010, and may display the sorted work objects 330. For example, a work object 330 whose progress state according to work progress information is the state in which a response has not been received from a work processor may be sorted as 'new'. A work object 330 whose progress state according to work progress information is the state in which a work is being processed may be sorted as 'doing'. A work object 330 requested by a work processor may be sorted as 'done' if the work object 330 has been completed. A work object 330 may be sorted as 'check' if a work producer has checked the completion of a work processor. In one embodiment, the user terminal 120 may summarize and display a progress state according to work progress information as in reference numeral 1090. The user terminal 120 may display a work object 330 like [•ooo] if it is sorted as 'new', may display a work object 330 like [o•oo] if it is sorted as 'doing', may display a work object 330 like [oo•o] if it is sorted as 'done', and may display a work object 330 like [ooo•] if it is sorted as 'check' so that a user can intuitively check the progress state of the corresponding work object 330.

The user terminal 120 may provide the sum of work objects 330 that are included in a chat room and whose state has been changed through the notification badge 1012. The user terminal 120 may provide users within a chat room with a work message and a chat message through the chat window 1020, and may send a free chat message through the chat message writing box 1030. In one embodiment, the user terminal 120 may provide a user within a chat room with the progress and deadline of a work object 330 through the chat window 1020. The user terminal 120 may enable a new user to enter a chat room through an add-friend button 1060 so that a user who participates in a chat exits from the corresponding chat room through an exit button 1050.

The user terminal 120 enables a plurality of users to access a create-work object button 1075, an add-image button 1080, and an attach-file button 1085 (e.g., change the corresponding buttons 1075-1085 from a hidden state to a hidden release state) through an add-message button 1070. The user terminal 120 may provide the create-work object button 1075 so that a plurality of users can generate a new work object 330, and may provide an interface so that participant can exchange images and files through the add-image button 1080 and the attach-file button 1085.

FIG. 11 is a diagram illustrating a work object list associated with a specific friend in the messenger implemented by the user terminal of FIG. 1.

Referring to FIG. 11, the user terminal 120 may receive user information 310 associated with a user terminal 120 from the work object processing apparatus 110, may provide a list of work objects 330 associated with a friend through the messenger, may receive work progress information from the work object processing apparatus 110 again whenever a work processor changes a progress state regarding a work object 330 is changed, and may update an interface and the work progress information.

The user terminal 120 may sort work objects 330 associated with a specific friend by the progress state according to work progress information, and may provide the sorted work objects to a chat room. The user terminal 120 provides work object summary information 1110, a work object list 1120, a progress processing process badge 1122, and a progress processing period 1124 through the messenger.

The user terminal 120 may provide the work object summary information 1110, including information about work objects 330 associated with a corresponding friend, through the messenger, may sort the plurality of work objects 330 by the progress state according to work progress information based on the work object summary information 1110, and may display the sorted work objects. The user terminal 120 may also provide the progress state of each of the work objects 330, associated with the corresponding friend, through the work object list 1120. In one embodiment, the user terminal 120 may provide the corresponding friend and a user with the corresponding progress state using the progress processing process badge 1122 and the progress processing period 1124.

FIG. 12 is a diagram illustrating an interface based on a work schedule in the messenger implemented by the user terminal of FIG. 1.

Referring to FIG. 12, the user terminal 120 may receive the deadline schedule list of a work object 330, associated with the user terminal 120 and including work deadlines, from the work object processing apparatus 110, and may provide the interface of dates that are associated with the work deadlines of the deadline schedule list and that are visualized in a schedule for each unit time through the messenger. The user terminal 120 may provide a user with a list of received work objects 330 based on a deadline schedule. In this case, the schedule for each unit time may include a yearly schedule, a monthly schedule, and a daily schedule.

The user terminal 120 may provide a work schedule 1210 in which the work deadlines of work objects 330 associated with a user can be checked in the messenger. The user terminal 120 may display dates set as the work deadlines of one or more objects 330 in which a user has been designated as a work producer or a work processor in different colors through the work schedule 1210, may display work objects 330 in which a user has been designated as a work producer and a work processor in different colors or selectively display the work objects 330 depending on user setting, may display a date set as the work deadline of a work object 330 in a different color in the work schedule 1210 depending on the progress state of the work object.

When a user selects a date displayed in a different color in the work schedule 1210, the user terminal 120 may provide a work object list 1220 based on a work schedule, including one or more work objects 330 in which the corresponding date has been set as a work deadline. The work object list 1220 based on a work schedule may be disposed below the work schedule 1210, and may be provided to a user along with the progress state of each work object 330 using a progress processing process badge 1222 and a progress processing period 1224 based on a work schedule regarding the work object 330.

Figure 13:
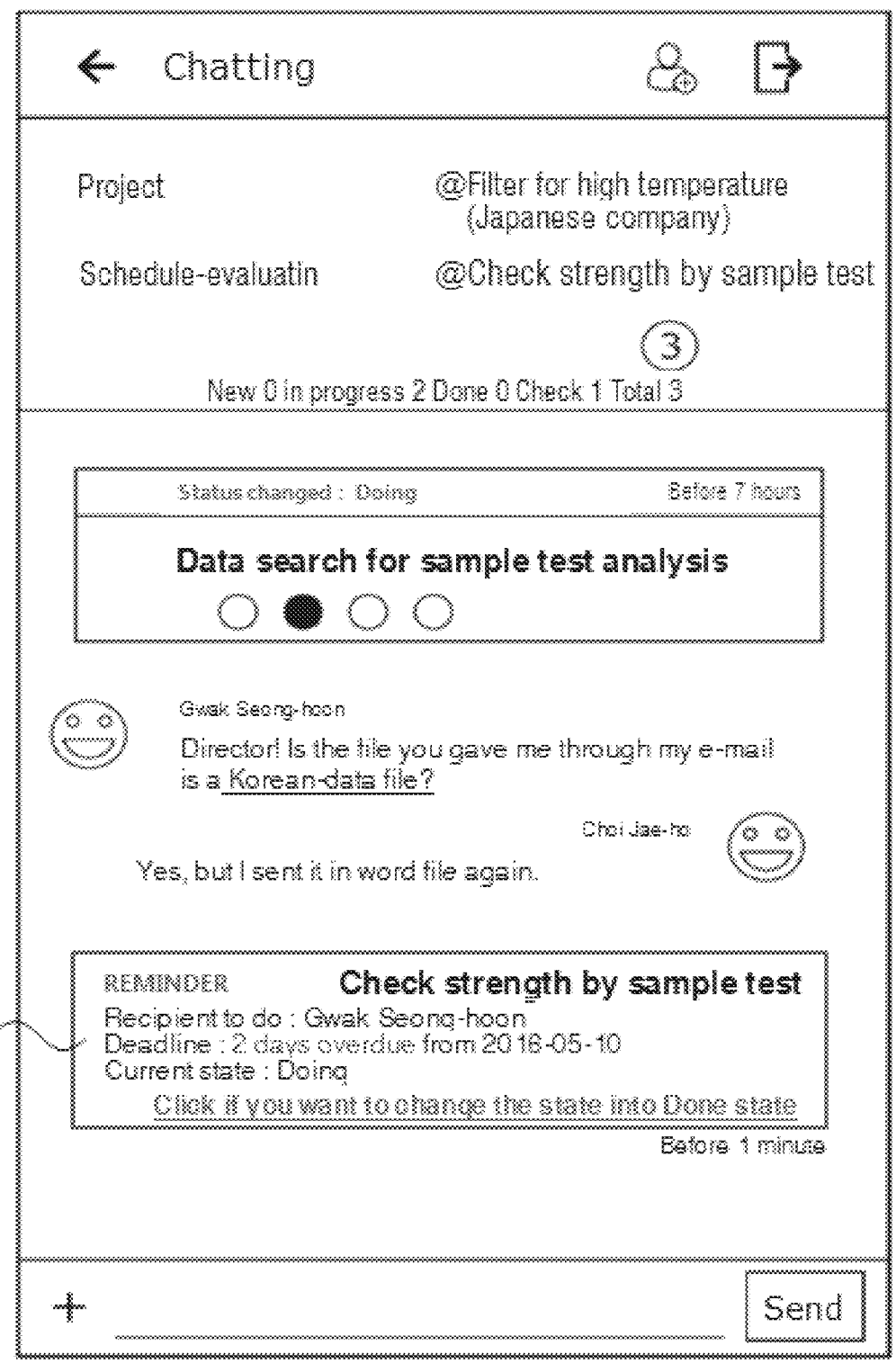
FIG. 13 is a diagram illustrating the provision of a remembrance message through a chat room in the messenger implemented by the user terminal of FIG. 1.

FIG. 13 is a diagram illustrating the provision of a remembrance message through a chat room in the messenger implemented by the user terminal of FIG. 1.

In FIG. 13, the user terminal 120 may receive a remembrance message 1310 associated with a user terminal 120 from the work object processing apparatus 110 and may provide the remembrance message 1310 to a corresponding user through a chat room.

The work object processing apparatus 110 may detect the time zone of a participant terminal that participates in a chat room associated with a corresponding user terminal 120 and that is associated with a work processor, and may delay the addition of a remembrance message 1310 regarding a work object 330 to a corresponding message thread 320 until the time when the corresponding work processor can receive the remembrance message 1310. If the time when the corresponding work processor can receive the remembrance message 1310 is reached, the work object processing apparatus 110 may add the remembrance message 1310 to the corresponding message thread 320 and provide it to the user terminal 120. When the remembrance message 1310 is received from the work object processing apparatus 110, the user terminal 120 may provide the remembrance message 1310 to a corresponding user through the chat room of the messenger.

The work object processing apparatus 110 may also provide remembrance urgency information about the remembrance message 1310 to the user terminal 120 so that the user terminal 120 can highlight the remembrance message 1310 associated with remembrance urgency by adding visual indication (indicate edges in red) to the remembrance message 1310. The work object processing apparatus 110 may provide the remembrance message 1310 including a state change button (may change from the 'doing' state to the 'done' state depending on the interaction of a work processor) capable of changing the progress state of a corresponding work object 330 into a next state.

Figure 14:
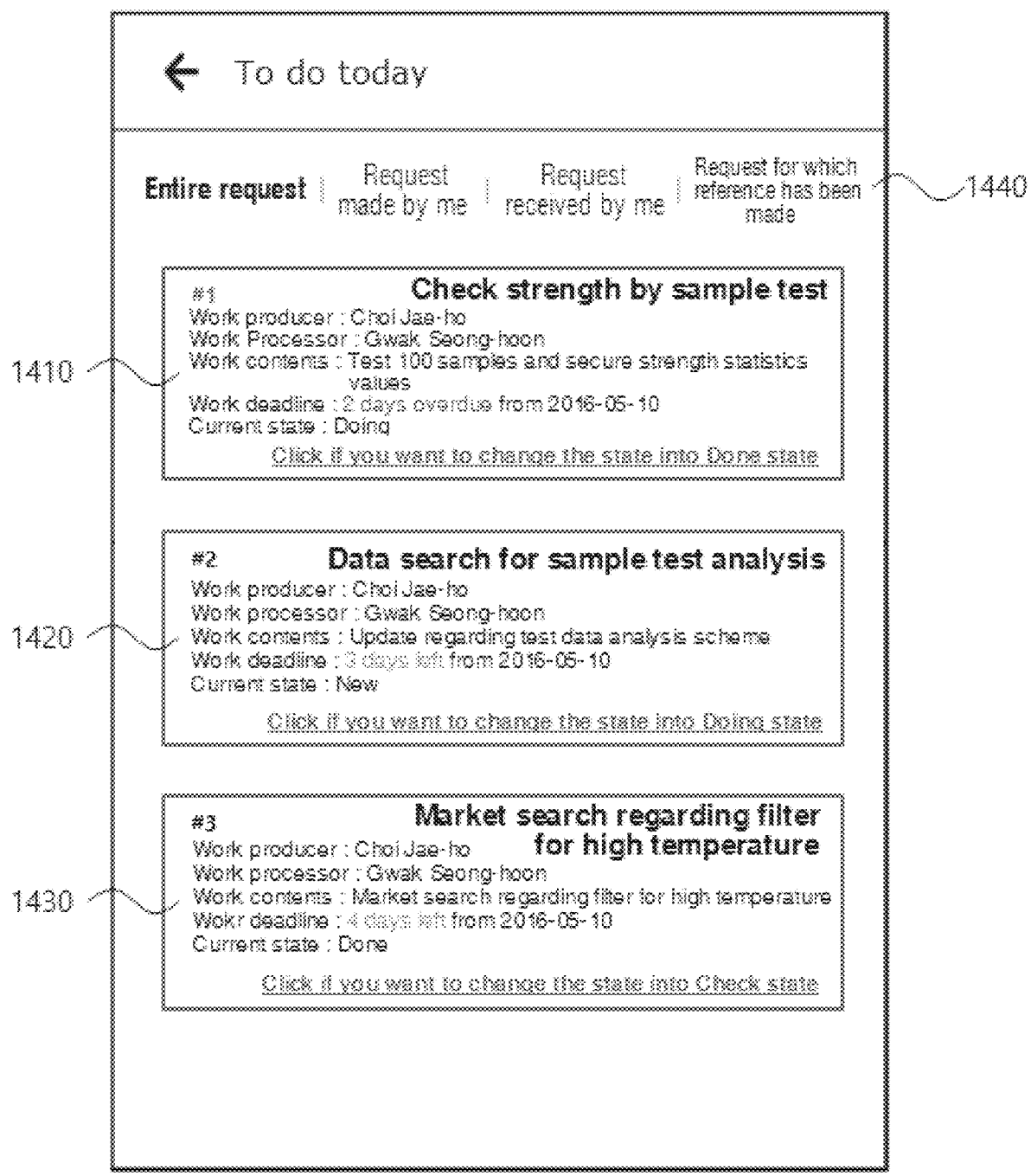
FIG. 14 is a diagram illustrating the provision of a work to-do-today in the messenger implemented by the user terminal of FIG. 1.

FIG. 14 is a diagram illustrating the provision of a work to-do-today in the messenger implemented by the user terminal of FIG. 1.

In FIG. 14, the user terminal 120 may receive a work to-do-today 1400 associated with the user terminal 120 from the work object processing apparatus 110 and provide the work to-do-today 1400 to a user through the messenger. In one embodiment, the work to-do-today 1400 may include a list of one or more work objects 330 aligned based on remembrance urgency and major information (including at least one of a work producer, a work processor, work contents, a work deadline, and work progress information) about an associated work object 330. For example, the user terminal 120 may align the to-do-today contents 1410 of a work object 330 regarding 'Check strength by sample test', the to-do-today contents 1420 of a work object 330 regarding 'Data search for sample test analysis', and the to-do-today contents 1430 of a work object 330 regarding 'Market search regarding a filter for high temperature' based on remembrance urgency determined based on work deadlines, and may provide the to-do-today contents.

Furthermore, the user terminal 120 may classify (1440) the work to-do-today 1400 as the 'entire request', a 'request made by me', a 'request received by me' or 'request for which reference has been made' through the messenger, and may provide the classified work to-do-today 1400 to the user terminal 120. In one embodiment, a user terminal 120 may be associated as an object that refers to a work although it has not been associated as a work producer or a work processor. The corresponding user terminal 120 may receive the work to-do-today 1400, including remembrance information about a work object 330 determined to be unnecessary to be reminded of, from the work object processing apparatus 110, and may provide support so that the object that refers to a work can share the progress of the corresponding work object 330 through the received work to-do-today 1400.

Although some embodiments of this application have been described above, those skilled in the art will understand that this application may be modified and changed in various ways without departing from the spirit and scope of the present invention written in the claims.

What is claimed is:

1. A work object processing apparatus, comprising:
   circuitry configured to
      receive a work object to be displayed through a chat room of an Internet messenger associated with a message thread, the work object including a work producer, a work processor, and work contents,
      process a work object operation on the message thread,
      process a work object state of the work object changed, from among a plurality of work object states of the work object included in a work processing diagram, based on a work interaction between the work producer and the work processor,
      allow a user terminal to access the work object which is in progress based on a work object identifier and provide the user terminal with a work message and a chat message displayed through the chat room of the Internet messenger in order of generation, and
      store, in the work processing diagram, a work deadline designated in the work object to previously inform the work processor associated with the work object of the work deadline,
   wherein a work instruction, work evaluation, or a work execution response is received through the work message and a chat regarding the work object is exchanged through the chat message.

2. The work object processing apparatus of claim 1,
   wherein the circuitry is further configured to provide the user terminal with a work object list including the work object identifier so that the user terminal accesses the work object.

3. The work object processing apparatus of claim 1,
   wherein the circuitry is further configured to provide the user terminal with a work object list including a chat room identifier so that the user terminal enters a chat room in which the user terminal now participates through the chat room identifier.

4. The work object processing apparatus of claim 1, wherein the circuitry is further configured to determine a work processing state by incorporating a request by one of the work producer and the work processor and another request by another of the work producer and the work processor, through the work processing diagram defining a work processing flow and a current work object state of the plurality of work object states of the work object.

5. The work object processing apparatus of claim 4, wherein when the work processing state is determined, the circuitry is further configured to provide the work producer with work processing state information, and associate a work processing state image associated with the work object state with the work processor so that the work processing state image associated with the work processing state is incorporated into a profile image of the work processor displayed on the Internet messenger.

6. The work object processing apparatus of claim 5, wherein if a work deadline has been designated in the work object, the circuitry is further configured to associate the work processing state image associated with the work object state with the work producer so that a work deadline image associated with the work deadline is additionally incorporated into the profile image of the work processor displayed on the Internet messenger.

7. The work object processing apparatus of claim 1, wherein the circuitry is further configured to determine a work object which belongs to work objects associated with the message thread and which is associated with a nearest work deadline to be a representative work object of the chat room and provide at least one participant terminal with the representative work object so that the representative work object is displayed in a specific region of the chat room when the at least one participant terminal enters the chat room.

8. The work object processing apparatus of claim 1, wherein the circuitry is further configured to provide each of users included in user information with a visualized work to-do-today of a work object set including at least one work object associated with each of the users and determined to be necessary to be reminded.

9. The work object processing apparatus of claim 1, wherein the circuitry is further configured to generate a reminder message according to a reminder condition before the work object state is changed to a next work object state after the work object state of the work object is set in the work processing diagram, and previously inform the work processor of a work deadline.

10. The work object processing apparatus of claim 9, wherein the circuitry is further configured to provide the work processor with the reminder message through the chat room associated with the work object.

11. The work object processing apparatus of claim 9, wherein when a progress state change of the work object is required from the user terminal through the reminder message, the circuitry is further configured to change the work object state of the work object to the next work object state in the work processing diagram of the work object to update a current work object state.

12. The work object processing apparatus of claim 11, wherein the circuitry is further configured to provide the chat room with the next work object state when the current work object state is updated.

13. The work object processing apparatus of claim 9, wherein while the circuitry previously informs the work processor associated with the work object of a work deadline, the circuitry is further configured to determine reminder urgency based on the work deadline and add a visual display to a portion of the reminder message when the reminder urgency is determined so that the reminder message is distinguished from a general reminder message.

14. The work object processing apparatus of claim 9, wherein while the circuitry previously informs the work processor associated with the work object of a work deadline, the circuitry is further configured to detect a time zone of the work processor to delay adding the reminder message to the message thread associated with the chat room until a receivable time of the work processor.

15. The work object processing apparatus of claim 1, wherein when the user terminal sorts a work to-do-today through the Internet messenger and determines that reminder of the work object is required, the circuitry is further configured to specify a reminder target associated with the work object to share a progress situation of the work object.

* * * * *